Aug. 19, 1969     M. BARTHALON     3,461,806
RECIPROCATING ELECTRIC MOTOR
Filed Aug. 30, 1968     9 Sheets-Sheet 1
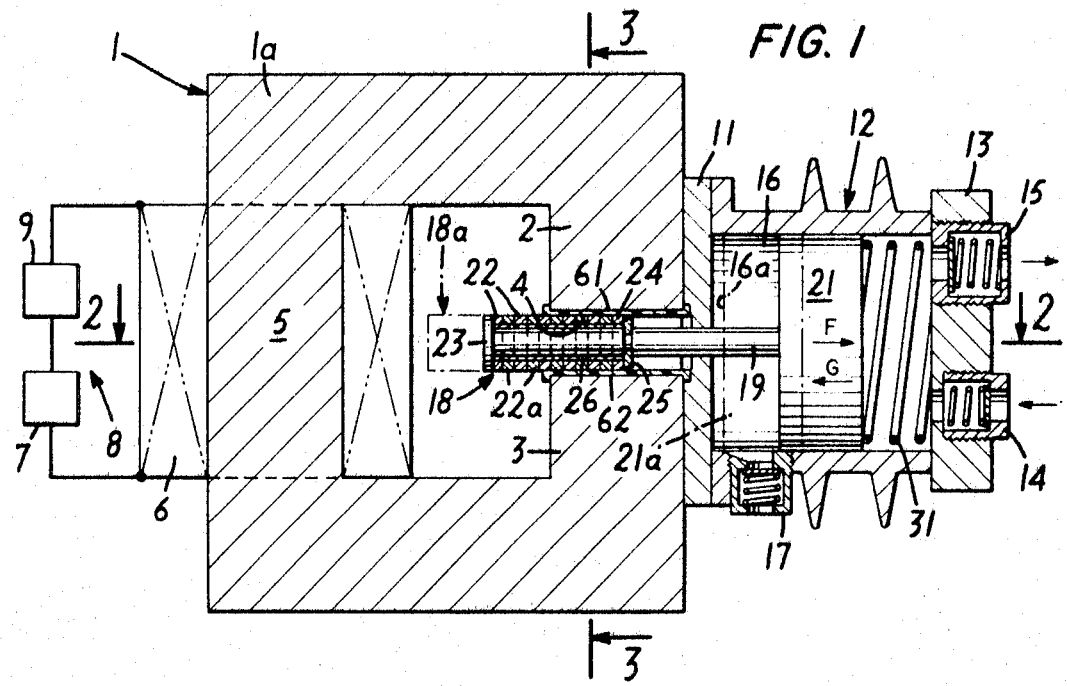
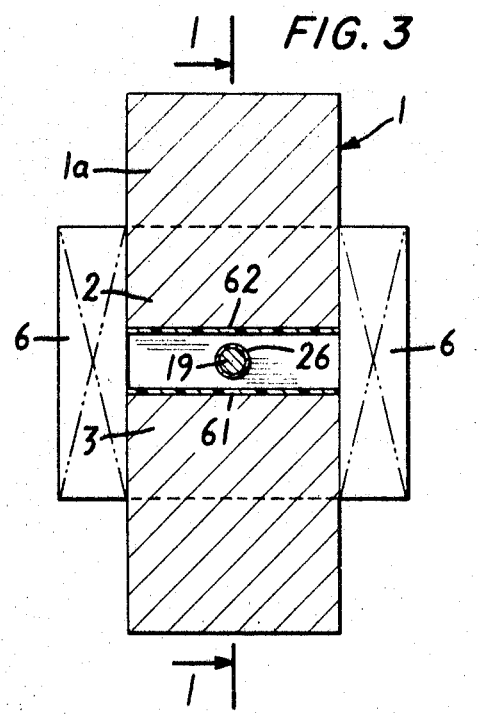
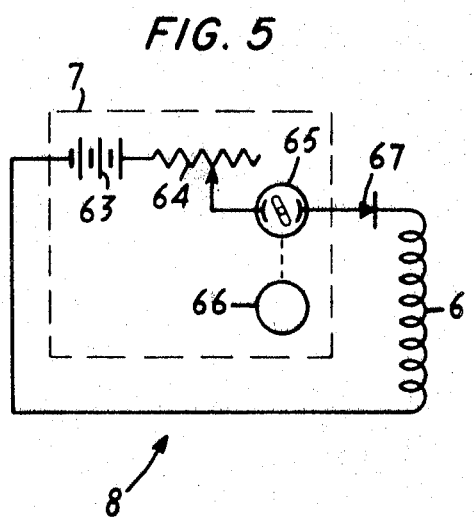
INVENTOR
MAURICE BARTHALON
BY
his ATTORNEYS

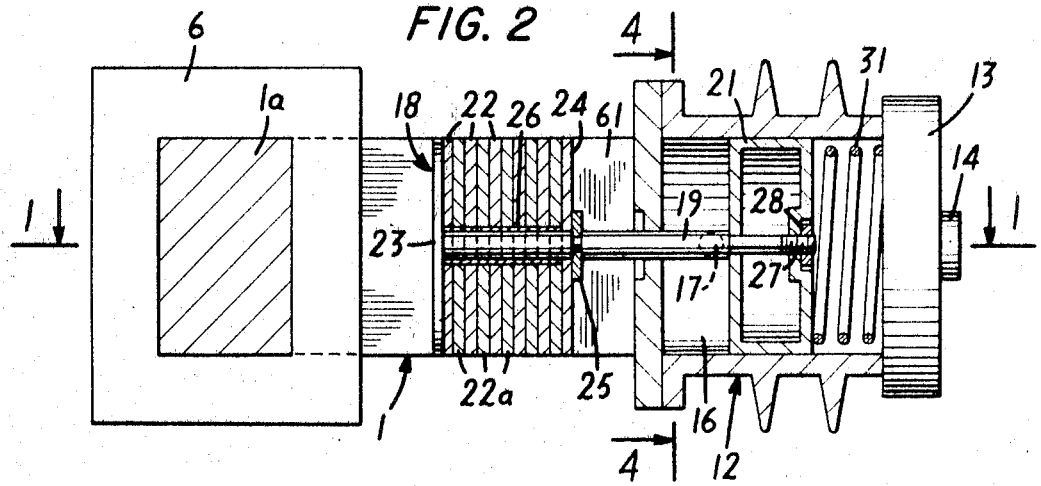
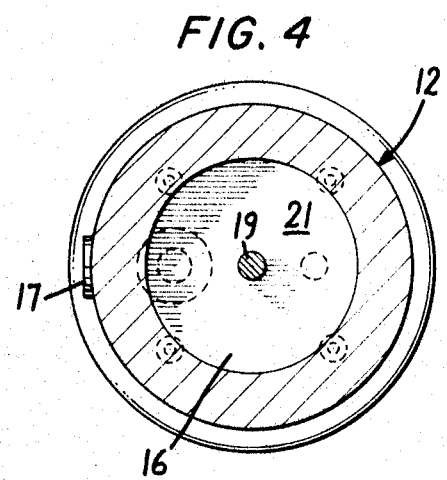
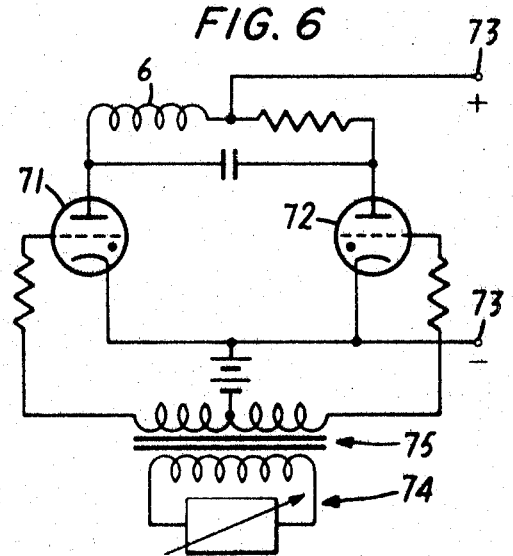
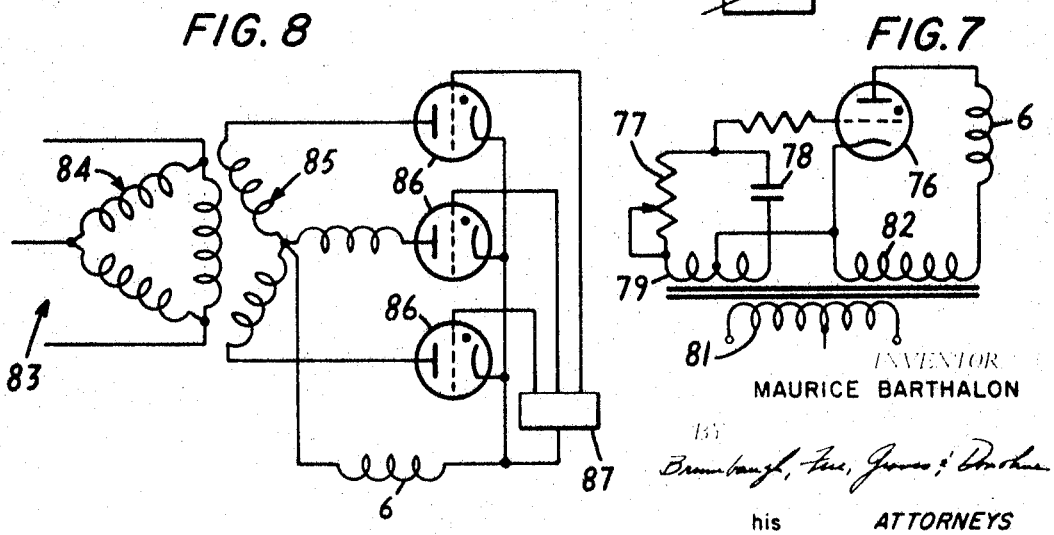

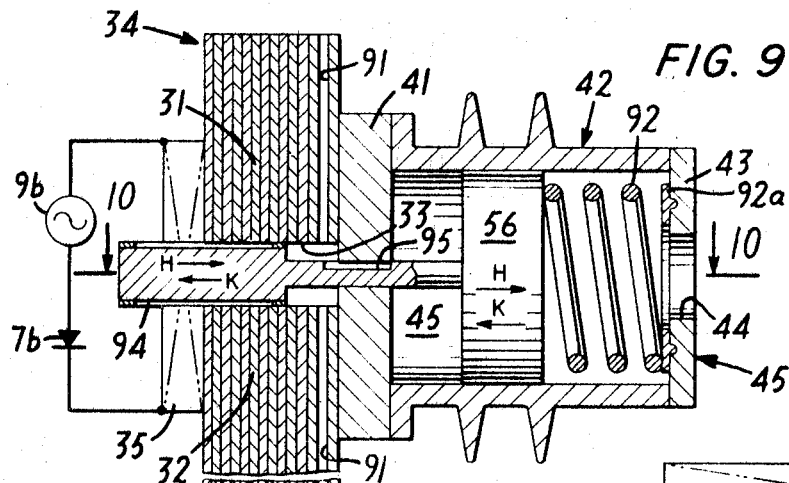
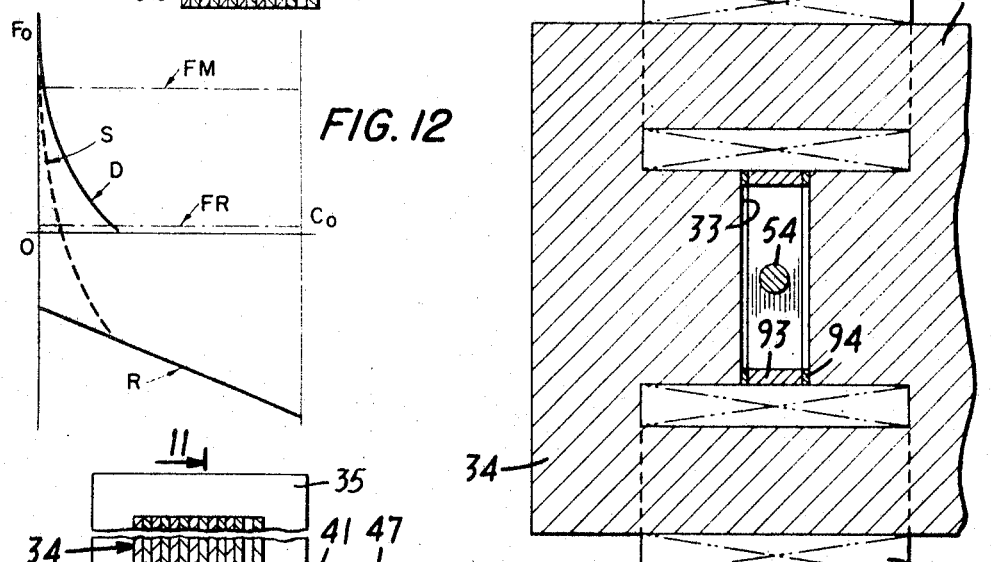
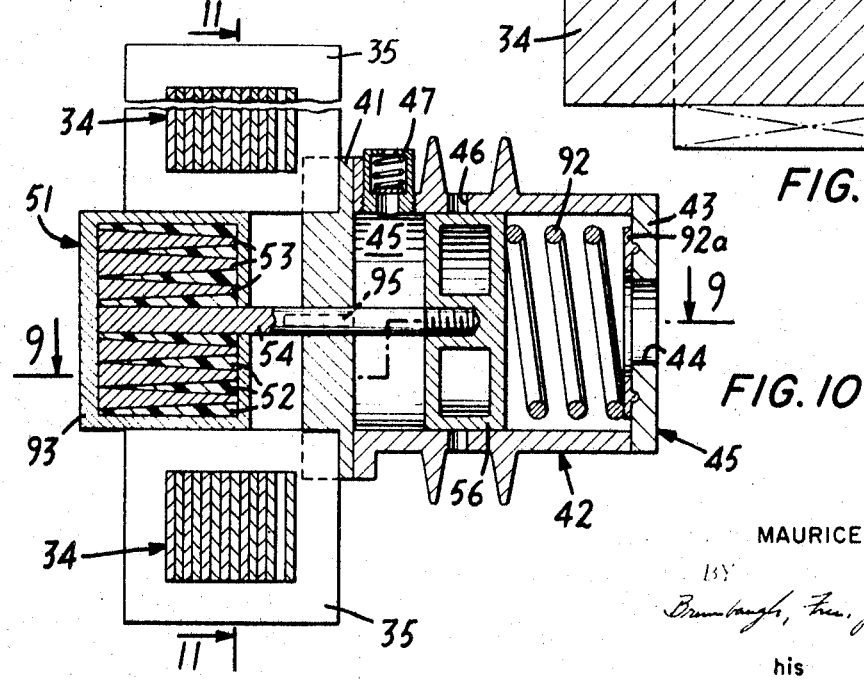

Aug. 19, 1969  M. BARTHALON  3,461,806
RECIPROCATING ELECTRIC MOTOR
Filed Aug. 30, 1968  9 Sheets-Sheet 4

INVENTOR
MAURICE BARTHALON

BY
Brumbaugh, Free, Graves & Donohue his  ATTORNEYS

Aug. 19, 1969　　　M. BARTHALON　　　3,461,806
RECIPROCATING ELECTRIC MOTOR
Filed Aug. 30, 1968　　　　　　　　　　　9 Sheets-Sheet 5

INVENTOR
MAURICE BARTHALON
BY
his ATTORNEYS

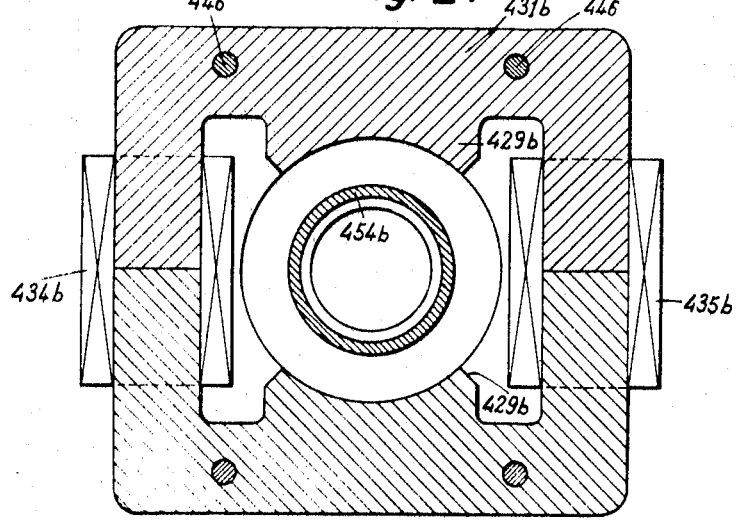
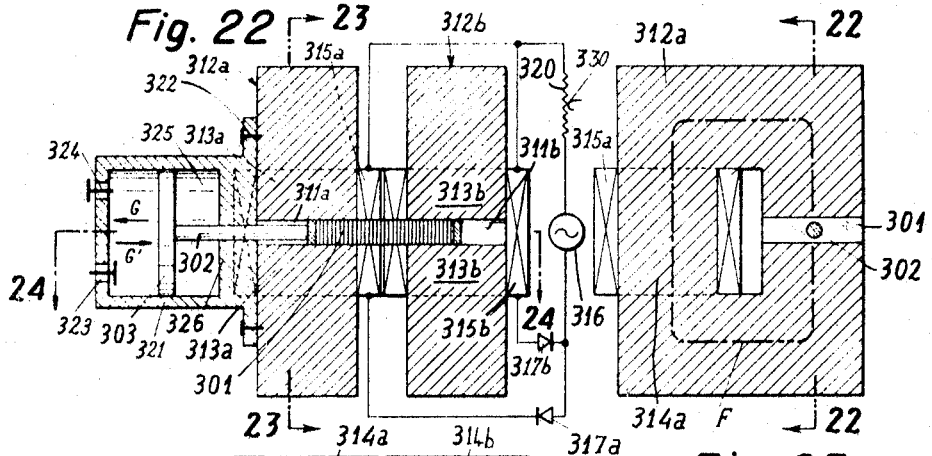
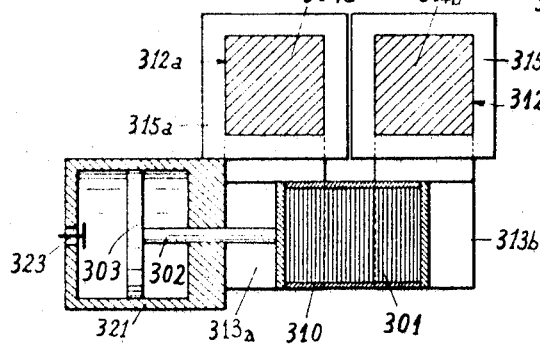

INVENTOR.
MAURICE BARTHALON

BY his ATTORNEYS

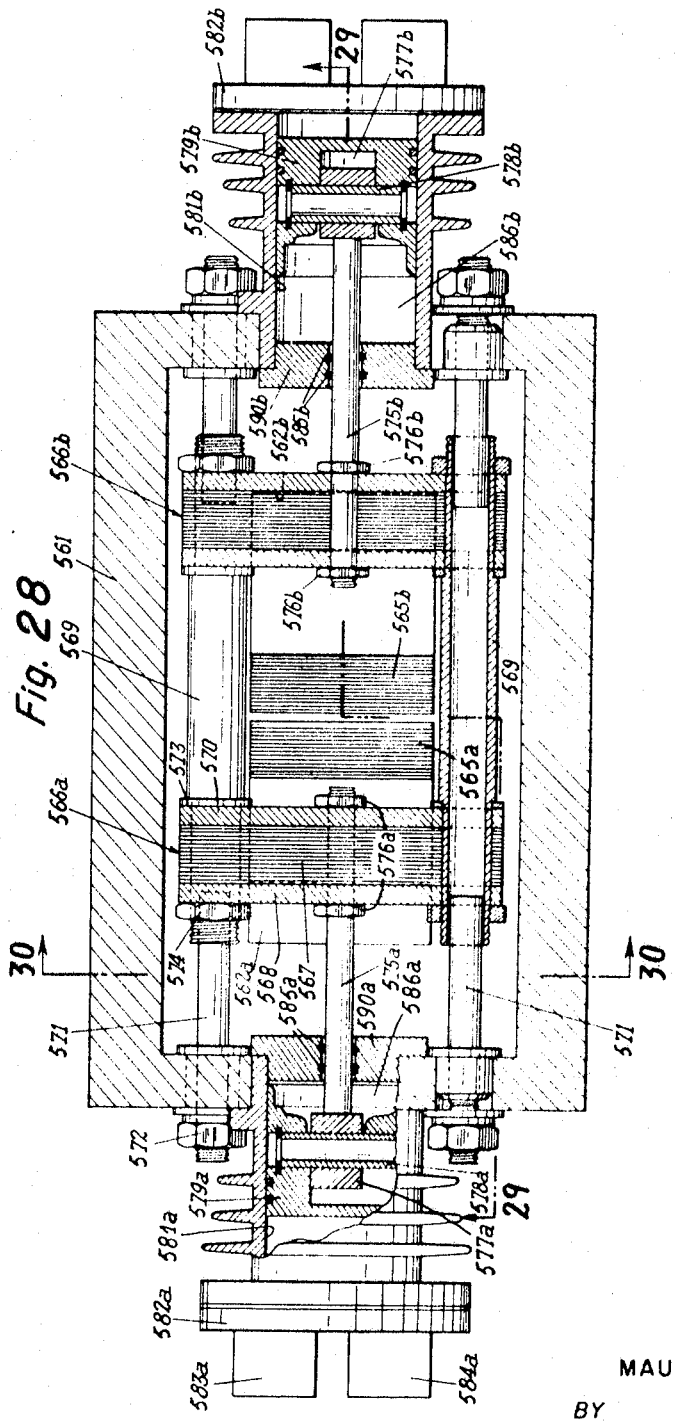

INVENTOR.
MAURICE BARTHALON
BY
his ATTORNEYS

United States Patent Office 3,461,806
Patented Aug. 19, 1969

3,461,806
RECIPROCATING ELECTRIC MOTOR
Maurice Barthalon, 78 Avenue Henri Martin,
Paris XVI, France
Continuation-in-part of applications Ser. No. 537,604,
Feb. 28, 1966, and Ser. No. 581,060, Sept. 21, 1966.
This application Aug. 30, 1968, Ser. No. 767,888
Claims priority, application France, Mar. 12, 1965,
8,974
Int. Cl. F04b *17/04;* H02k *7/14, 33/02*
U.S. Cl. 103—53                                73 Claims

ABSTRACT OF THE DISCLOSURE

A reciprocating machine having an electric motor and a device such as a pump, compressor or various vibratory devices, driven by the motor. The motor has at least one electromagnetic circuit having a pair of spaced-apart poles defining an air gap and at least one field coil adapted to generate a magnetic field across the air gap, and a magnetic armature mounted for reciprocating movement along an axis disposed transversely to the magnetic field and coupled to the driven device. The motor field coil is supplied with a succession of unidirectional electric current pulses, the power supply including current control elements that prevent the current from reversing direction in the field generating coil at the end of each current pulse and for initiating each pulse only when the supply voltage is of proper polarity. Upon each current pulse, the armature is pulled into the air gap by the forces exerted on it, by the electromagnetic field. The armature is driven in a direction to move the major portion of it out of the air gap after each current pulse by mechanical or pneumatic or electromagnetic forces created by a return means distinct from the motor. The machine may have two circuits, each supplied alternatively with unidirectional electric current pulses so as to impose an electromagnetic force on an armature reciprocating back and forth between them (or an armature associated with each of them), and two driven devices, one being powered on each power pulse while the other acts to return the armature.

This application is a continuation-in-part of co-pending applications Ser. No. 537,604, filed Feb. 28, 1966, and Ser. No. 581,060, filed Sept. 21, 1966, both cases now abandoned.

Background of the invention

This invention relates to reciprocating electric motors of the type which include at least one fixed electromagnetic circuit provided with an induction winding and one or more independent magnetic armatures movable in the field created by the fixed magnetic circuit.

A motor of the type which the invention is concerned can be used to drive reciprocating pumps and compressors using pistons or diaphragms, such as refrigeration compressors and heat pumps, air and gas compressors of medium and high pressure, and medium and high pressure pumps, especially variable delivery pumps, such as those used in control equipment of various types. It may also be used in various vibratory machines such as mechanical sieves, vibratory conveyors, rams, electric hammers, riveters, fatigue testing machines for industry, vibratory test benches, industrial portable tools such as reciprocating saws, and sanders and for domestic equipment such as beaters, electric carving knives, razor, vibrators, sewing machines, and the like.

An electric motor known in the art, which is used in conjunction with a reciprocating pump, comprises a power coil connected to an A.C. power source and an armature in the form of a plunger. One of the alternations of the current displaces the piston in one direction and during the other alternation, which is suppressed by rectifier, the piston is returned to its initial position by elastic return means.

Such a mechanism is unable to achieve an appreciable stroke and a high unit power because the magnetic force exerted on the armature rapidly becomes too small in relation to the mass of the moving parts as the unit power increases. The efficiency is low because of large flux leakage. Furthermore, the electromagnetic force exerted on the armature varies slowly with change of stroke and, in particular, does not fall to zero at the end of the stroke. Consequently, it is not practicable to control the stroke accurately by acting on the current impulses, and it is necessary to provide an adjustable mechanical stop to vary delivery. The control of this stop requires an external mechanism which complicates the mechanical structure of the machine.

In another known type of electro-pneumatic machine, the magnetic circuit is of variable reluctance, comprising, for example, an electromagnetic circuit between the pole pieces of which moves an armature connected to a piston. The armature comprises an assembly of teeth and the magnetic circuit includes a number of branches greater than the number of pairs of pole pieces. Such a machine can, in practice, only function as an A.C. generator, the piston being actuated by expansion of a driving fluid in such a way as to constitute a free piston generator. Furthermore, there are energy exchanges between the common branches of the magnetic circuit which results in losses.

Another form of reciprocating electromagnetic machine proposed heretofore is a compressor which consists basically of a cylindrical armature of magnetic metal slidably fitted within a stationary cylinder which is also magnetic and on which two magnetizing coils are wound. Both coils are supplied with current from the same alternating-current source through rectifiers which are connected to act in opposition. This device accordingly comprises two coaxial electromagnets of the solenoid type which have a common armature core. A compressor of this type has low specific mass output inasmuch as the forces of magnetic attraction per unit mass of the armature are relatively weak. Moreover, one electromagnetic circuit interacts with the other, and flux leakage is high, which results in poor efficiency. Furthermore, the driving force varies to only a minor extent over the range of armature displacement, and the force variation takes place over a length of travel which is not large enough to permit accurate control. Such a device therefore entails the use of mechanical end-of-travel damping devices, thereby complicating its construction.

Summary of the invention

The machine of this invention embodies a motor and associated elements that remedy the foregoing and other limitations when it is used to power pumps, compressors and other fluid devices as well as mechanical devices of the types listed above. Its possibilities of application include a wide variety of machines, since its structural and operating characteristics result in remarkable dynamic properties.

According to the invention, the motor part of the machine comprises at least one fixed electromagnetic circuit, which includes a magnetic core with spaced-apart poles and one or more field-generating coils, and at least one magnetic armature for each pair of poles mounted for reciprocating movement of variable stroke in the magnetic field created by the magnetic circuit between its poles. The armature is adapted to be mechanically connected to a reciprocating power input mechanism of the device which is driven by the motor.

An important feature of the motor is that the lines of force of the magnetic field in the air-gap separating the poles are directed transversely to the axis of reciprocation of the armature; further, the induction coil of the magnetic circuit is connected to a source of electric current delivering a succession of unidirectional impulses, such as the pulsed current obtained by half-wave rectification of alternating current, so that the armature is driven by the magnetic force in only one direction.

Matching means driving the armature in the one or in the other direction is provided to match the output of the motor to the input of the driven device. Such matching means includes a suitable return means properly matched to the motor and to the device driven by the motor, which return means is distinct from the magnetic circuit and returns the armature to a position locating its major portion outside the air gap between its electromagnetically driven phases.

Various devices which permit current to flow only in one direction (apart from, of course, any breaking back current of a duration measured in microseconds) can be used in the power supply for the magnetic circuit. Such devices may include diodes, semi-conductor rectifiers or the like, all of which have a precise and semi-instantaneous action and create pulsed current having a wave form which is precise and regular.

The matching means may include an elastic force medium, such as a spring or a gas cushion acting either in the same direction as the electromagnetic driving force or in the opposite or return direction and serving to provide synchronous operation. Where the elastic force is in the same direction as the electromagnetic force, the parameters of the magnetic circuit and the characteristics of the elastic force medium are designed such that the mean value of the magnetic forces acting on the magnetic armature during the electromagnetic power stroke are of the same order of magnitude as/and preferably greater than the mean value of the resultant of the forces exerted by the elastic force mechanism on the armature during the power stroke. This feature results in a low amount of stored energy at the end of each cycle and is important because it ensures that the current pulses and not the elastic energy will govern the movement of the armature. In practice the characteristics of the machine will preferably be chosen so that the electromagnetic driving force will be from 1 to 20 times the elastic driving force, so that it is the electromagnetic force which controls the movement.

In a motor according to the invention, a clearly defined magnetic field is created transverse to the axis of movement of the magnetic armature. Further, the pulsed unidirectional current supply precisely determines the moment when the electrical impulse occurs, so that the electromagnetic attraction on the armature will be suddenly modified at the end of the stroke. The current is prevented from reversing direction, and each pulse is initiated only when the voltage is of proper polarity by appropriate design of the power supply.

According to a further feature of the invention, the speed of movement of the armature should be approximately in phase with the current, and preferably should lag the current. However, the amount of lag is kept small because the maximum efficiency of energy transfer is obtained when the mechanical speed and the current are in phase. This arrangement ensures a favorable compromise providing efficiency and stability of operation. Under these conditions the natural frequency of the moving part, taking into account all the elastic forces applied, pneumatic and mechanical (including the load) should, by construction, be made at nominal output close to, and, under all intended part load operating conditions, slightly less than the frequency of the impulses from the power supply. More particularly, the mass of the moving parts of the motor and all of the forces (mechanical and pneumatic) are designed to be such that the natural frequency of oscillation of the moving parts under the influence of all forces will lie preferably between about 50% and 110% of the frequency of the current pulses. This result can be obtained by providing a suitable matching means acting on the moving parts of the machine. Where the motor is used to drive pumps and compressors the natural frequency at the maximum delivery pressure should be preferably close to the frequency of the current pulses. Such a condition is obtained in particular when the forces which return the armature to its start position at the beginning of each electromagnetic driving cycle are sufficient to accelerate the armature such that it returns to its starting position in a slightly longer time than a half period of the current pulses.

The two conditions just stated, a low stored energy and a natural frequency close to or slightly less than the frequency of the current pulses, result, in optimal matching of the motor to the driven device and in practice, the stroke of the moving parts never becoming excessive, thereby avoiding dangerous mechanical shocks. Furthermore, there is no risk of inversion of the sign of the phase of the mechanical oscillations relative to the electrical pulses which would result in the machine operating as an electrical generator. In fact, although inversion of the direction of electric current will in any case be prevented by the rectifier or its equivalent circuit elements, it is preferable for good efficency and stability of operation of the motor to avoid establishing such an unstable condition of operation by the mechanical means considered.

According to another preferred characteristic of the invention, the poles of the magnetic circuit, the air gap, the coils, the moving armature and its laminations are designed in such a way that the increase in flux, as a function of the movement of the armature into the air gap, is approximately linear under stationary conditions and for a constant magnetizing current. This condition may be achieved by various means, notably:

By designing the armature so that it has, in every position, a lower permeability than that of the magnetic circuit, such as by interposing thick sheets of insulation between the laminations of the armature;

By laminating the polar zones of the magnetic circuit or grooving them perpendicular to the axis of armature movement;

By the form of the air gap;

By the use of coils placed on each side of the air gap —or again by a combination of these various factors and more generally by all means preventing an excessively rapid increase of flux across the armature at the beginning of its movement into the air gap such that the current and the mechanical movement are almost in phase. Such a condition provides optimum efficiency of energy transfer from the magnetic circuit to the armature and improves functional stability.

It is also preferred that the space separating the faces of the armature from the corresponding poles be appreciably greater than the maximum possible transverse movement from the axial position allowed by the guides and mountings carrying the armature. In practice this clearance is chosen to be more than twice the mechanically possible lateral displacement. Thus, lateral forces resulting from the action of the magnetic field on the armature are avoided. Otherwise these forces might reach an excessively high value and create friction which would be prejudicial to correct phasing between mechanical movement and the current and, consequently, to good efficiency.

A motor embodying the principles of the invention may have but one electromagnetic circuit providing an electromagnetic stroke operating in one direction (i.e., single acting), or it may have two or more electromagnetic circuits arranged to move a single moving part structure by electromagnetic strokes in both directions (i.e., double acting). An energy output may take place during either the electromagnetic stroke or strokes or the return stroke or strokes in both the single-acting and double-acting forms. An energy output may be provided only when the moving parts move in one direction, or energy outputs may be provided on both the back and forward movements of the moving parts.

In the form of motor, according to the invention, which comprises at least one sliding armature structure which is adapted to move between two stationary magnetic circuits, each having a magnetizing winding, the windings of the two circuits are each supplied with pulsed unidirectional current derived from an alternating-current source by rectification by rectifiers which are connected to act in opposition so as to produce magnetic fields in the circuits in alternate sequence. The poles of the two magnetic circuits are separated and are disposed on either side of the volume swept by the sliding armature, the lines of force within the air-gaps formed between said pole-pieces being directed transversely with respect to the direction of displacement of the armature.

In a preferred two circuit form, the stationary magnetic circuits are of similar geometry and are arranged in symmetrical relation to a given centerline. This arrangement is preferred, but not necessary, the only requirement being that the air gaps are in separated relation. The air gaps, which will generally be identical to each other as to geometry and size, can have various shapes such as, for example, parallelepipedal, annular or cylindrical, in order to permit the reciprocating motion therethrough of an armature of corresponding shape. Furthermore, those circuits can be brought relatively close together with the interposition of a non-magnetic spacer. The air gap in a form of motor having only one magnetic circuit may, of course, also be of various shapes as may be suited to the purpose of the motor and to manufacturing techniques.

Because the flux varies in the magnetic circuit or circuits of the motors, the cores should be laminated to reduce losses resulting from eddy currents, the laminations being at right angle to the direction of displacement of the armature. The armature can also be laminated, for the same reason, and/or in order to give it a high reluctance in the direction of motion. However, in the case of small machines, it is possible, because of the small volume and thickness of the armature, to form it of solid magnetic material which has a high saturation induction and high resistivity, provided that all portions of the armature which at any given time are located simultaneously within the air gaps of two fixed circuits are separated by a non-magnetic zone in order to prevent a merger or connection of both magnetic field circuits. When the armature has a tubular volume, it is advantageously made up of a stack of annular laminations which are clamped between two annular flanges forming part of one or two bodies of revolution forming pistons, the pistons being disposed on each side of the armature and secured to each other. This arrangement provides a compact machine which is of simple construction, requires little machining, and can be manufactured at relatively low cost.

With machines according to the invention, the magnetic flux of variable density through which the armature passes can be defined with accuracy and decreases very rapidly outside of the air-gap, with the results that the variations in magnetic flux which occur at the time of displacement of the armature can be very substantial, that the forces exerted on the armature vary rapidly at both ends of the travel of the armature, and that the leakage flux can be thus kept low. The specific mass output of the machine can thus attain high values.

The structural characteristics of the armature are preferably such that, in all of its positions relative to the circuit poles, those portions of the armature which are located between the poles and which are assumed to be magnetized are saturated. This saturation of the armature makes it possible to limit the saturation of the stationary magnetic circuits.

The invention permits the construction of motors which are light in weight and exhibit very stable operation. The motor will start instantaneously, even at full load, with normal operating current. Furthermore, the stroke of the armature may be controlled substantially instantaneously from 0 to 100%, as is also the case for the delivery flow rate or pressure of fluid when the electric motor is used to drive a pump or compressor. The high force to mass ratio of the armature allows to obtain a much longer stroke than obtained before and therefore allows operation of machines having a much higher output per unit.

Brief description of the drawings

For a better understanding of the invention, reference may be made to the following description of exemplary embodiments, taken in conjunction with the figures of the accompanying drawings, in which:

FIG. 1 is a side view in section of one embodiment, the view being taken generally along a plane defined by the lines 1—1 of FIGS. 2 and 3, and in the direction of the arrows;

FIG. 2 is a top view in section of the embodiment of FIG. 1 taken generally along the plane defined by the lines 2—2 of FIG. 1;

FIG. 3 is an end view in section taken along the lines 3—3 of FIG. 1;

FIG. 4 is a view in vertical section taken generally along the lines 4—4 of FIG. 2;

FIGS. 5 to 8 are diagrams of four different power supply and motor control circuits which can be used with the electric motors of the invention;

FIG. 9 is a side view in section of another embodiment of the invention, the view being taken along a plane defined by the lines 9—9 of FIG. 10 and in the direction of the arrows;

FIG. 10 is a view in section of the embodiment of FIG. 9 taken generally along the lines 10—10 of FIG. 9;

FIG. 11 is a view in vertical section taken along the lines 11—11 of FIG. 10;

FIG. 12 is a diagram representing typical forces operating a motor of the invention;

FIG. 22 is a side view in section of a fifth embodiment, the view being taken generally along a plane depicted by the lines 22—22 of FIG. 23, which includes the axis of the armature;

FIG. 23 is a view in section of the fifth embodiment taken along the lines 23—23 of FIG. 22;

FIG. 24 is a sectional view taken along the lines 24—24 of FIG. 23;

FIGS. 26 and 27 are transverse sectional views of the sixth embodiment taken along the lines 26—26 and 27—27 of FIG. 25, respectively;

FIG. 28 is a longitudinal sectional view taken along the line 29—29 of FIG. 8, showing another form of the invention;

Description of exemplary embodiments

Figure 13:
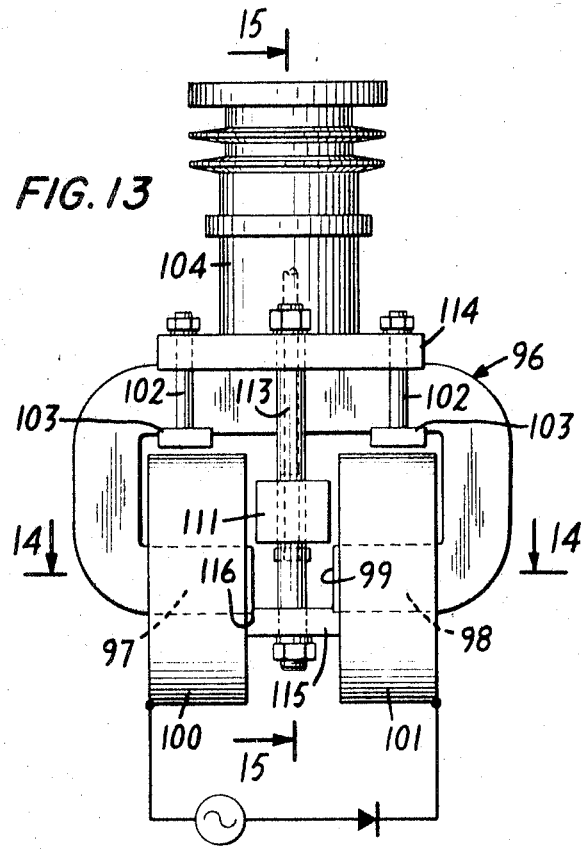
FIG. 13 is a side elevational view of a third embodiment of an electric motor construction in accordance with the invention.
Figure 15:
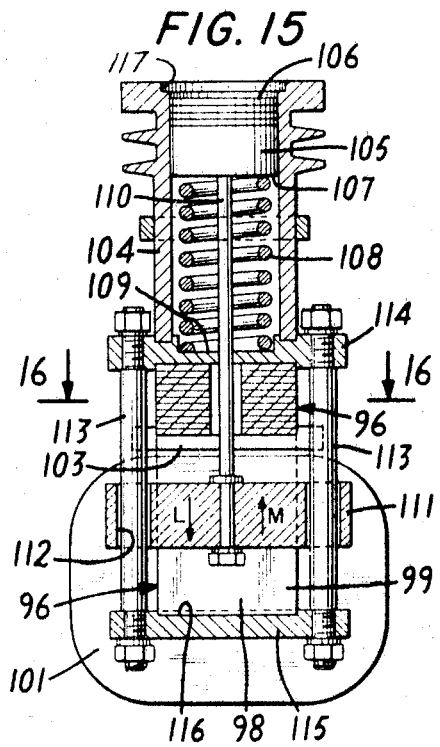
FIG. 15 is a top view in section taken along the lines 15—15 of FIG. 13.
Figure 14:
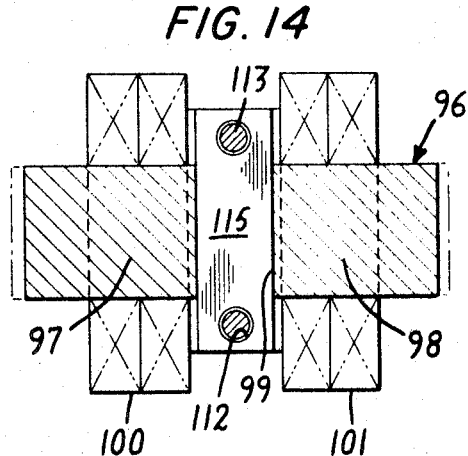
FIG. 14 is an end view in section of the embodiment of FIG. 13 taken generally along the lines 14—14 of FIG. 13.
Figure 16:
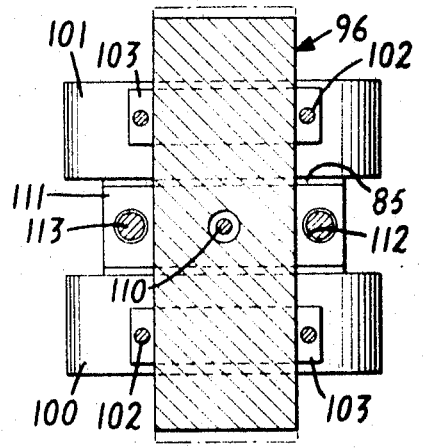
FIG. 16 is a vertical section of the embodiment of FIG. 13 taken along the lines 16—16 of FIG. 15.

The embodiments of the invention shown in the drawings and described hereinafter are exemplary of the use of the electric motor of the invention to power a pump or compressor. In each embodiment, the pump or compressor unit forms an integral part of the motor structure by, for example, serving as a guide or mounting for the motor armature. The electric motor of the invention is particularly well suited for pumps and compressors, but it will be understood by those skilled in the art that the motor, per se, has utility in a variety of other devices, as previously referred to.

The embodiment shown in FIGS. 1 to 4 comprises a fixed magnetic circuit 1 having a C-shaped core 1a of magnetic material of rectangular cross section and laminated parallel to the plane of the C. The bisector plane of the circuit 1 passes through the axis of the motor, and its two branches form poles 2 and 3 separated by a parallelepiped air gap 4.

The surfaces of the poles facing the air gap 4 are faced with thin plates 61 and 62 of an anti-friction, non-magnetic material having low electrical conductivity, such as polytetrafluoroethylene ("Teflon"), to facilitate the sliding movement of the magnetic armature in the air gap, as will be described later. Preferably, the combined thickness of the plates 61 and 62 is chosen so as not to exceed ⅕ of the total thickness of the air gap 4.

Wound around the part 5 of the core 1a which is opposite to the air gap 4 is an induction coil 6. The coil 6 is connected to a source 7 of unidirectional electrical current pulses (pulses of the same sign). A suitable supply circuit 8 comprises, for example, a rectifier 9 for permitting the circulation of electric current in only one direction and initiating each current pulse when the voltage of a given polarity is impressed upon the field coil and controlling the interruption of each pulse when the current in the coil becomes substantially zero and maintaining the interruption until the supply voltage is again applied.

A suitable device is also provided to act on the current pulses supplied by the source 7 so as to regulate the power delivered to coil 6; such device may act on the amplitude, the duration or the frequency of the pulses or on all these parameters at the same time. A diagram of a suitable circuit is shown in FIG. 5. The power source comprises a source of direct current, such as a battery 63, supplying voltage which is varied by means of a potentiometer 64, the wiper arm being connected to one of the terminals of a rotary contact breaker 65 driven by a variable speed motor 66. The other terminal of the contact breaker 65 is connected to the coil 6 through a rectifier 67.

The potentiometer 64 allows control of the amplitude of the pulses, their duration being controlled by acting in a suitable manner on the arrangement of the rotary contact breaker 65 and their frequency by acting on the speed of motor 66. Other power supply control circuits are described later.

Attached to the pole pieces 2 and 3 is the lower cylinder head 11, which is made of non-magnetic material, of a cylinder 12. The axis of the cylinder lies in the longitudinal bisector plane of the core 1a. The cylinder 12 is closed by an upper cylinder head 13 and has an inlet valve 14 and an outlet valve 15. The lower end portion 16 of the cylinder 12 constitutes a pneumatic return zone by reason of the establishment and maintenance of a vacuum cushion in the portion 16, as described below. A valve 17 for bleeding off any gas leaking in from the head section of the cylinder is installed in the cylinder wall.

The moving parts of the electric pump comprise a magnetic armature 18 positioned to move in and out of the air gap 4 along an axis lying in the longitudinal bisector plane of symmetry of the magnetic circuit 1. The armature 18 is connected by a rod 19 to a piston 21 located in the cylinder 12. The piston 21 may, for example, comprise a hollow body screwed onto threads 27 formed on the end of the rod 19 and fixed by a lockscrew 28 (FIG. 2). Engaged between the face of the piston 21 opposite the vacuum cushion 16 and the cylinder upper head 13 is a return spring 31 which acts in conjunction with the vacuum cushion to return the armature 18 to its rest position of starting outside of the air gap 4 of the magnetic circuit 1, where the electromagnetic stroke begins.

The armature 18 may be formed as a laminate of alternate plates 22 and 22a of magnetic material and insulating material, respectively, threaded onto the rod 19 and tightened between an end plate 23 at the end of the rod and a retaining plate 24 held in place on the rod by a snap ring 25. The compression of the laminations 22 is limited by a spacer 26 interposed between the plate 23 and the retaining plate 24. The magnetic armature 18 is thus laminated transversely with respect to its axis of reciprocation.

A particular feature of the moving parts of the embodiment of FIGS. 1 to 4 is that its stroke is not fixed nor even mechanically limited. On the contrary it may vary considerably as a function of modifications to the parameters defining the current pulses supplied to the coil 6.

The armature 18 should be dimensioned such that for each of its positions in the air gap, it will be saturated to a value $m$ of magnetic flux less than a value $M$ corresponding to the saturation of the magnetic circuit 1. For example, the ratio $k=m/M$ may lie between 0.1 and 0.99, depending on the position of the armature.

Such an arrangement appreciably reduces the iron losses of the motor and improves the desired linearity of flux variation as the armature enters the air gap under static conditions. In fact, supposing that $k$ equals 0.6 and that under static conditions a part of the armature is introduced itno the air gap while keeping the current I at constant value, by feeding the coil 6 from an auxiliary source of direct current, the flux passing across the armature is equal to only 60% of that which it would be if the permeability of the armature were equal to that of the circuit ($k=1$). Thus, the variation of flux at the beginning of movement of the armature into the gap is limited and that available for the rest of the stroke is relatively increased, which allows, for a given value of I, an almost linear variation of flux in relation to the movement of the armature into the gap, and thus a constant force on the armature, since the motion force is equal to $Idm/dx$, where $x$ refers to the distance the armature moves. As a result, under static conditions and consequently under running conditions the motive force FM is proportional to I. Calculations and tests show that if this condition is fulfilled, an optimum energy transfer coefficient is obtained.

Figure 17:
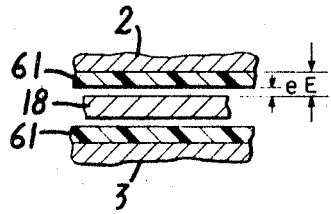
FIGS. 17 and 18 are views in transverse section of an armature on an enlarged scale depicting two arrangements of the spacing from the poles.

It is preferred that the residual mechanical clearance $e$ (see FIG. 17) between the armature 18 and the plates 61, 62 should be appreciably less than the distance E (FIG. 17) separating the armature 18 from the pole faces 2 or 3 so that the armature 18 cannot depart appreciably from an equilibrium position equidistant from the poles. This precludes the creation of a force on the armature parallel to the lines of flux: this is useful as any substantial movement of the armature from an equilibrium position results in a force, which increases rapidly with increasing displacement, that moves the armature against the nearest pole and results in very high friction losses. In practice distance E is chosen to be equal to at least twice the maximum possible lateral displacement of armature 18 with the motor in new condition.

At rest, the piston 21 is at the position shown in phantom lines 21a in FIG. 1 and leaves a vacuum cushion volume which is only a small part 16a of its volume at the end of a power stroke; meanwhile, the armature 18 is in a position in which the major part of it is outside the air gap 4, as shown in phantom at 18a.

When the induction coil 6 is energized by a unidirectional current pulse supplied by the source 7, the armature 18 is attracted into the air gap 4 and pushes piston 21 in direction F. This compresses the fluid in the head end of cylinder 12, and the compressed fluid is delivered through the discharge valve 15.

When the pulse ceases, the flux decreases very rapidly in the air gap 4, and the vacuum cushion 16 together with the then compressed spring 31 return the piston 21 in the direction indicated by the arrow G, thus inducing the opening of the suction valve 14. At the end of the stroke the air in the residual volume 16a of the cushion 16 is compressed and contributes to the return of the piston 21 in direction F. Air entering the cushion 16 as a result of leakage is expelled to atmosphere through the valve 17.

As has been indicated, the cushion 16 and the return spring 31 are designed such that there is a net force exerted by them in the direction F during the electromagnetic power stroke. This net force should, however, preferably have a mean value less than the mean value of the electromagnetic driving force. This can be achieved by providing only a relatively small volume for the space 16a.

Furthermore, the mass of the moving parts and the elastic, pneumatic forces are calculated to be such that the natural frequency of oscillation of the moving parts under the influence of al these forces will lie between 50 and 99% of the frequency of the current pulses at all loads other than nominal and close to said frequency at nominal load preferably within 10% of it.

Similarly, the elastic return force in the direction G exerted by the vacuum cushion 16 and the spring 31 at the end of the power stroke is kept sufficiently small relative to the mass of the moving parts (or in other words, the natural frequency of the moving parts is sufficiently low) such that the moving parts return to their initial positions (18a, 21a) immediately after the beginning of the next current pulse.

From the two immediately before mentioned conditions, it results that return and elastic means achieve correct matching of motor output to driven device input.

By varying the characteristics of the power pulses (amplitude, duration, frequency) or, more simply, by varying only their amplitude by means of the potentiometer 64 (FIG. 5), control of the power and delivery rate may be effected. For a given electrical supply, there is automatic adaptation of the stroke of the moving parts to the load.

A pump constructed according to the above-described embodiment offers significant technological advantages: it is very light in weight and possess a high power to weight ratio; when starting there is no overcurrent, no complicated electrical mechanism is needed, and starting is instantaneous, even with full load. Its delivery flow or delivery pressure are substantially instantaneously variable from 0–100%. The movement of the moving parts is precisely controlled. It is stable, and the stroke immediately adapts itself to the resisting force, thus no special pneumatic starting mechanism is necessary. Since the cushion 16 is purely static the number of moving parts is very small, which is advantageous for a long service life. In the case of a pump of medium or high unit power the return of piston 21 by cushion 16 avoids mechanical difficulties arising from metal springs of large sizes. The arrangement of the magnetic circuit makes the lateral space requirements very small (FIG. 2). Furthermore, the piston 21 is entirely circular and it is not subjected to any lateral thrust from a connecting rod so that the service life of the piston and the cylinder is long.

It is within the scope of the invention to provide a motor similar to the above-described embodiment with two fixed electromagnetic circuit parts simultaneously energized instead of one, each one attracting an armature and piston assembly in opposite directions and enabling a substantially vibrationless machine to be built.

In practice many other power supply circuits than those shown in FIG. 5 may be used to energize the induction coil 6 with impulses whose voltage, duration or frequency may be varied at will. In particuar, it is advantageous to use thyratrons or thyristors which may be supplied with either direct current or polyphase alternating current according to any one of many arrangements known in the art per se.

FIG. 6 shows an exemplary circuit for the control of pulses energizing the coil 6 which comprises two thyratrons 71, 72, acting in opposition supplied from a source of direct current 73 or from a rectifier, and whose grids receive starting and stopping pulses from a variable frequency oscillator 74 through a transformer 75.

In the case of alternating current supply, provision may be made for control by variable dephasing between the grid voltage and the anode voltage. FIG. 7 gives an example of one arrangement among the many possible. The grid 76 of a thyratron is fed from a dephasing circuit with a controllable phase angle (variable resistance 77 and capacitance 78) by the secondary 79 of a transformer whose other secondary 82 supplies the anode circuit of the thyratron.

Thus, the coil 6 may be supplied from a three phase distribution 83 (FIG. 8) by means of a star delta coupling 84, 85 and three thyratrons 86 whose grid voltages are controlled by a suitable control unit 87 of a known type so that the rectified current pulses supplied to coil 6 may be controlled. In these various arrangements the thyratrons act both as the supply and as the rectifier at the same time.

The preceding examples are given only as illustrations. Many other ways of providing controlled uni-directional current pulses are obviously possible, notably those using semi-conductors.

The compressor shown in FIGS. 9 to 11 is also of the type having single acting electrical and single acting mechanical components, but the mechanical power delivery takes place during the return stroke of the moving parts, all of the electromagnetic energy having first been stored in an elastic return mechanism (a mechanical spring in the example described).

The magnetic circuit is constituted in this embodiment by a core having common branches forming pole pieces 31, 32 separated by an air gap 33 of parallelepiped shape. The pole pieces 31, 32 are joined by two opposed lateral portions 34 which carry induction coils 35 connected in parallel across a suitable power supply, such as that obtained by interposing a diode 7b in series with a source of alternating current 9b. The core is laminated perpendicular to the longitudinal axis of the machine, and is also rigid, thereby limiting the attraction of the poles towards each other. The lamination of the electromagnetic circuit also gives the maximum concentration in the air gap of the deformation of the lines of flux due to the armature, improves the linearity of increase of flux with movement of the armature and thus contributes to improved power and efficiency. In this embodiment, the induction coils can, alternatively, be mounted on the pole pieces 31 and 32 which helps to concentrate the flux in the air gap and so reduces flux leakage. The pole pieces 31 and 32 are drilled with various cooling channels 91 terminating in the air gap 33.

On one side of the magnetic circut is attached a nonmagnetic lower head 41 of a cylinder 42 whose axis is orthogonal to the longitudinal plane of symmetry of the core 34. The cylinder 42 is closed by an upper head 43 having a large orifice 44. In the cylinder 42 is a compression space 45 adapted to communicate with the atmosphere by suction ports 46 and one or more suction valves 47. Located in the cylinder on the other side of the piston from compression space 45 is a spring 92 which bears on the upper head 43 and tends to push the piston 56 toward the lower head 41.

A stop 92a, which is free to rotate, is interposed between spring 92 and cylinder head 43. This avoids any torque which the spring 92 might otherwise exert on the moving part which would force the armature into an oblique position and rapidly wear the bearing surfaces of the armature guide. This may also be achieved by making the crown of piston 56 free to rotate relative to the rod 54.

The moving parts comprise a magnetic armature 51 consisting of a single piece of material in which have been formed parallel grooves so as to constitute, in substance a row of parallel plates 53 oriented parallel to the flux and to the axis of the machine. This type of armature construction offers the particular advantage, especially for large machines having high acceleration, of providing the effect of laminations arranged in the direction corresponding to maximum rigidity, but overcoming problems arising from the possible collapse of the alternate nonmagnetic laminations in the usual laminated structure. The thickness of these plates 53 may increase progressively along each plate, the thinnest part being at the end which first enters the air gap so as to avoid too rapid in increase of permeability at the beginning of the stroke.

The empty spaces between the plates 53 are preferably filled with a non-magnetic material such as epoxy resin 52 in which may be formed cooling passages (not shown). The whole of the armature is enclosed by a frame 93 whose sides facing the pole faces 31 and 32 are covered with a layer 94 of material having a low coefficient of friction, such as polytetrafluoroethylene. This layer 94 contacts pole pieces 31 and 32.

Figure 18:
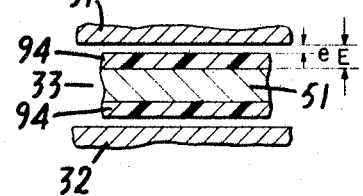

The smallest dimension of the armature 51 in a direction perpendicular to the electromagnetic field is at least equal to twice the thickness of the air gap. This reduces flux losses, clearly defines the zone of magnetic attraction of the armature and increases the power to weight ratio. For the same reasons as those given above, it is also preferred, as shown in FIG. 18, that the lateral clearance $e$ of the armature 51 in the air gap 53 be constant and be determined by the thickness of the layer 94. It should be less than ⅕ of the width (distance between the poles) of the air gap 33. Furthermore, the air gap E between the armature 51 and the pole pieces 31, 32 should be at least equal to twice $e$.

The armature 51 is extended by a connecting rod 54 which passes through the lower cylinder head 41, and the piston 56, which is free to move in the cylinder 42, is threaded onto the end of the rod.

The characteristics of the spring 92 which is compressed between the piston 56 and the upper cylinder head 43, and of the clearance volume of the compressor 45 are calculated to exert a small net force when the armature 51 is in a position which corresponds to the absence of energization of the coil 6 and the natural frequency of the moving parts may in any case be lower than that of the induction current pulses at all loads other than nominal and close to that of said pulses at nominal load.

The electro-compressor further comprises an automatic cooling system by forced convection in the channels 91. To this end the rod 54 has a groove 95 acting as a slide valve, which at the beginning of the compression stroke permits communication between space 45 and the air gap 33 and thus with the grooves 91.

The operation of the embodiment of FIGS. 9 to 11 is as follows: when the coils 35 are energized, the armature 51 is attracted into the air gap 33 in the direction indicated by the arrow H, which compresses the spring 92. The air contained in the compression space 45 expands and creates a pressure below atmospheric pressure, thus allowing outside air to enter into space 45 through the ports 46 as soon as they have been uncovered by the piston 56. When the electric impulse ceases, the elastic energy stored in spring 92 returns the moving parts in the direction K. The air contained in the space 45 is compressed by the piston and discharged through the outlet valve 47. The groove 94 permits communication between space 45 and the gap 33 during part of the return stroke, and part of the compressed air flows through the cooling channels 91 and provides forced cooling of the motor.

Because the electromagnetic force acting on the armature 51 is a function of the movement of the armature through the air gap, the stability of operation of the machine is enhanced; the electromagnetic force follows the current during each current pulse but ceases rapidly at the end of the pulse.

Here again the moving parts oscillate at the frequency of the current pulses and, all other things being equal, the length of the stroke depends on the resisting force acting on the moving parts. The power to weight ratio is higher than in the first embodiment, and the maximum possible stroke for a given frequency is greater.

The return movement by the spring 92 provides an effective solution and requires no sealing, as in the case of air cushions. The embodiment is therefore well suited for low power machines.

The natural frequency of the moving parts is relatively low, and the small value of the spring energy stored in the machine at the dead point corresponding to the start of the power stroke results in good cyclic stability of operation and lighter machine. The iron losses of the fixed magnetic circuit are small, especially if saturation of this circuit can be avoided by providing for saturation of the armature 51 at a flux value lower than that which saturates the fixed circuit element. The longitudinal space occupied by the machine is also very small.

It may be noted tht good results have been obtained on an air compressor of the type described above having the following characteristics:

Cylinder diameter _____ mm__ 23
Stroke _____ mm__ 16
Thickness of air gap (between poles) _____ mm__ 12
Width of air gap (along pole faces) _____ mm__ 19
Power supplied to coils _____ watts__ 100
Delivery pressure _____ kg./cm.$^2$__ 8
Mass of moving part _____ g__ 280
Stiffness of spring _____ kg./cm__ 4.5
Initial compression of spring _____ mm__ 12
Magnetic armature, not laminated, of silicon iron or "Permendur" (high saturation induction and high resistivity).
Pulsed feed to the coils at 50 c.p.s. by half-wave rectification (using a diode) of alternating current.

Another dynamic characteristic which should be embodied in the motor and important for its operational stability will be explained in the following, reference being made to FIG. 12 showing the power stroke $C_o$ and the forces $F_o$.

Curve D is the expansion curve of the compressed air remaining in the clearance volume of the compressor.

Curve R corresponds to the force of return of spring 92.

Curve S corresponds to the algebraic sum $(D+R)$ of the mechanical and pneumatic elastic forces.

Straight line FM shows the mean value of the electromagnetic forces during the power stroke.

Under these conditions the machine operates such that the mean value FM of the resultant of the electromagnetic forces during the power stroke will be preferably greater than the mean value FR of the resultant in the same direction corresponding to the elastic forces exercised by all the elastic elements (springs and/or pneumatic cushions) acting on the moving parts during this same stroke. The mean value FR thus defined corresponds to the positive area under curve S (the shaded area on FIG. 12). Determination of this area allows curve FR to be drawn. For example, it is advantageous for FM to be greater than 5 times FR.

In the case of the air compressor described above and shown in FIGS. 9 to 11, the following values were obtained.

Mean value of electromagnetic force $FM = 12$ kg.
Mean value of net elastic forces in the same direction $FR = 0.8$ kg.

The cylinder head 43 of the second embodiment may be replaced by the cylinder head 13 of the first. In this way a double-acting machine would be obtained, one which operates partially during the power stroke and partially during the return stroke. In such a case the return stroke could be used only to produce scavenge air for cooling the magnetic circuit.

The reciprocating electric motor shown in FIGS. 13 to 16 is also of the type in which useful work is effected during the return stroke, but the compressor cylinder in this case is attached to the closed part of the core of the magnetic circuit opposite the air gap, which allows the induction coils to be mounted, to advantage, on each side of the air gap. A spacer centered in the air gap maintains it at a constant width and supports the guides for the armature. Such an arrangement permits operation with a much smaller clearance between the armature and the poles and thus provides high efficiency.

More particularly, the embodiment of FIGS. 13 to 16 comprises a fixed magnetic circuit 96 having a pair of spaced-apart pole pieces 97 and 98 defining an air gap 99. The pole pieces 97 and 98 are surrounded by induction coils 100 and 101, the edges of which are located, for example, at something less than 0.5 mm. from the edges of the air gap. The coils are connected in parallel across a power supply (shown diagrammatically in FIG. 13) consisting simply of the interposition of a diode between a source of alternating current and the windings which provides half-wave rectification of the alternating current. The core of the magnetic circuit is laminated perpendicular to the axis of movement of the armature.

On the edge of the portion of the fixed magnetic circuit 96 opposite the air gap is attached, by means of bolts 102 and flanges 103 of non-magnetic material, a nonmagnetic compressor cylinder 104 closed by a cylinder head (not shown) similar to that shown in FIG. 1. Slidable in the cylinder 104 is a compressor piston 105. A spring 108 between the back of the piston 105 and the base 109 of the cylinder 104 tends to push the piston 105 to a position farthest from the cylinder base 109. The piston is attached by a rod 110 to a solid magnetic armature 111 which, for the specific design of a machine according to FIGS. 13 to 16 described below, gave the best results. The armature 111 is drilled with holes 112 which guide it on rods 113 covered with an anti-friction material such as polytetra-fluoroethylene ("Teflon"). The rods 113 are centered at one end in bores drilled in the base flange 114 of the cylinder 104 and at the other end in a non-magnetic spacer 115, which is itself centered relative to the air gap 99 by shoulders 116. The magnetic forces tending to draw the poles together are imposed on the spacer 115.

The operation of the above-described embodiment is as follows: when the induction coils 100 and 101 are energized, the armature 111 is drawn into the air gap 99 in the direction L, which compresses spring 108. The air contained in the compression space 117 at the head end of the cylinder is expanded to a lower pressure than atmospheric. This allows the admission of external air into space 117 through the suction valves (not shown, but see FIGS. 1 to 4). When the electrical impulse ceases, the elastic energy stored in the spring 108 returns the moving parts in direction M. The air contained in the space 117 is thus compressed, then delivered through the discharge valve (not shown, but see FIGS. 1 to 4).

Good results have been obtained with a compressor of the type described above having the following characteristics and operating under the following conditions:

Cylinder diameter 40 mm.
stroke 20 mm.
width of air gap (between poles) 20 mm.
power supplied to the coils 500 watts.
delivery pressure 5 kg./cm.$^2$.
mass of moving parts 700 g.

The characteristics of the spring 108 used were the following:

10 free coils giving no force at a free length of 110 mm. and a force of 50 kg. at a compressed length of 85 mm.
coils supplied with rectified AC current at 50 c.p.s. obtained by half-wave rectification of the AC current by means of a diode.

Spring 108 returns the moving part to its original position in slightly more than $\frac{1}{100}$ of a second (duration of one-half cycle).

Figure 19:
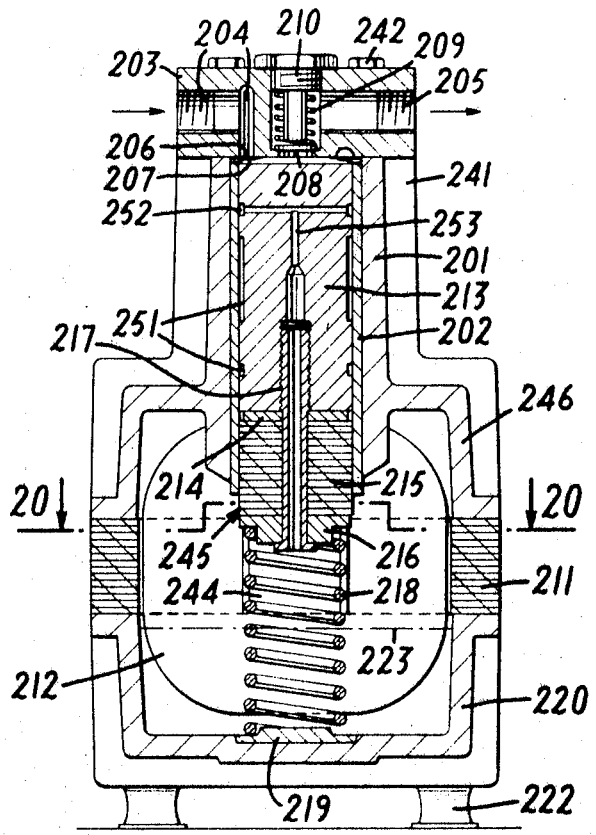
FIG. 19 is a vertical section of another embodiment of an electric motor according to the invention.
Figure 20:
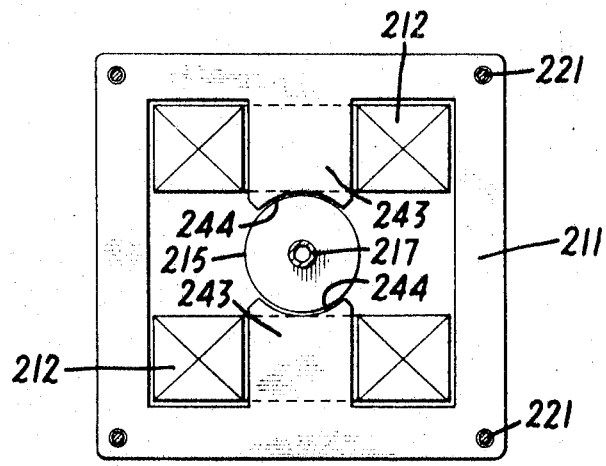
FIG. 20 is a transverse section taken generally along the lines 20—20 of FIG. 19.

FIGS. 19 and 20 show, as another embodiment of the invention, a low power electric air compressor suitable for fabrication by mass production techniques and similar in several respects to the embodiment of FIGS. 9 to 11, but remarkable for, among other features, the structure of the sliding armature.

Figure 21:
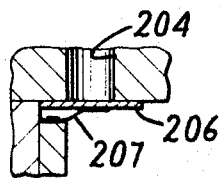
FIG. 21 is an enlarged detail taken from FIG. 19.

The compressor of FIGS. 19 and 20 comprises a cylinder 201 having light-weight alloy fins 241 cast under pressure around a cast iron liner 202. Attached to the cylinder 201 by four screws 242 is a finned cylinder head 203 (also of light-weight alloy) carrying inlet and delivery connections 204 and 205, respectively, an inlet valve element 206 (see FIG. 21) and its spring 207, a delivery valve 208 located in the center, its spring 209, and its valve mounting element 210.

The electric motor has a fixed magnetic circuit core element 211 made of stamped sheets which are stacked and glued together and formed to provide two pole pieces 243 located opposite each other. The pole faces 244 are arcuate and co-axial with the cylinder 201, as shown in FIG. 20. An induction coil 212 is mounted on each pole piece 243; the coils 212 are connected in series with a single phase alternating current supply, a diode (not shown) being interposed between them and the current supply.

The moving part 245 of the compressor comprises an iron piston 213 separated by a non-magnetic spacer 214 from the cylindrical armature 215, which is of the same diameter as the piston 213 and consists of laminations stacked with insulation between them. A spring 218 engages the armature 215 through a non-magnetic piece 216 and the bottom of the casing 220 through an insulating washer 219. Parts 213, 214, 215 and 216 are joined by means of a tube 217 screwed into the piston 213. The cylindrical shape of the armature 215 permits the moving part 245 to turn about its axis.

The lower finned casing 220, also cast of a light-weight alloy, and the upper casing 246 together define extensions of the cylinder 201 and also clamp together the laminations of the core element 211. They are joined by adhesive and by four insulated bolts 221 (FIG. 20). The compressor is supported on four elastic feet 222 which are very soft in a direction parallel to the axis of the machine.

The compressor is lubricated by an oil bath reaching approximately to a level indicated by the line 223. During operation, the rapid movement of the coils of the spring 218 in the oil causes splashing in the casing which cools and lubricates the assembly. Grooves 251 on the piston 213 carry up oil splashed by the spring to lubricate the liner 202. A groove 252 and a passage 253 prevent air leakage from removing oil from the bore. The passage 253 communicates with the casing 220, 246 and maintains in it a pressure approximately equal to the indicated mean pressure of the compressor. Thus an air cushion having very low stiffness is obtained, the air cushion supplementing the action of spring 218. The amount of leakage is controlled by the distance from the crown of piston 213 to groove 252 and by the diameter of passage 253. The clearance between the piston 123 and the liner 202 is on the order of 0.01 mm., while the distance from the armature to the magnetic sole of the air gap is on the order of 0.1 mm. so that there is no possibility of a lateral force on the armature due to eccentricity.

Representative characteristics of a compressor conforming to FIGS. 19 and 20 are given below.

| | | |
|---|---|---|
| Bore | mm | 23 |
| Stroke | mm | 16 |
| Diameter of armature | mm | 23 |
| Height of air gap | mm | 19 |
| Mass of moving part | g | 300 |
| Mean spring force | kg. F | 9 |
| Delivery pressure | kg./cm.$^2$ | 9 |
| Output | litres per minute | 6 |
| Power | watts | 90 |

The fact that the armature 215 of the embodiment of FIGS. 19 and 20 has a diameter equal to that of piston 213 permits easy and rapid machining with high precision. Since the moving part 245 is entirely free to rotate about its axis, service life is excellent.

In the embodiment of the invention illustrated in FIGS. 22 to 24, the motor is also used to drive a compressor (or pump) of the single-acting type. The machine of FIGS. 22 to 24 comprises an armature 301 to which a piston 303 is connected by means of a rod 302. The armature 301 is slidably mounted between the air-gaps 311a, 311b of two magnetic circuits 312a, 312b of identical construction and of annular configuration. Each magnetic circuit consists (as shown in FIG. 22) of one pair of pole-pieces 313a and 313b, respectively, associated with laminated magnetic cores 314a and 314b.

The two circuits 312a, 312b are mounted in parallel relation and are held by a suitable frame (not shown in the drawings). Induction coils 315a, 315b, which are designed to induce a magnetic flux along the path F of FIG. 23, are wound on the respective cores, the flux being impressed across the air-gaps 311a and 311b. The circuits 312a and 312b are located a sufficient distance apart to ensure that their mutual induction is negligible.

The sliding armature 301 has a flattened parallelepipedal shape and is clamped within a non-magnetic frame piece 310. The frame forms a part of a slide which is guided through the air-gaps. The thickness of the frame is equal to that of the air gaps 311a, 311b, less the clearance which is necessary for a sliding fit. The width of the armature is substantially greater than its thickness; for example, its width may be two to four times its thickness. The thickness of the armature is less than that of the frame in order that the armature will not contact the pole faces.

The armature 301 is laminated, and the rectangular laminations of magnetic sheet material which form the armature are oriented at right angles to the axis G–G' along which the armature slides. Thus, the laminations are parallel to the lines of flux across the air-gaps 311a and 311b between the oppositely-facing pairs of pole-pieces 313a or 313b.

The laminations of the armature 301 can be separated from each other by ordinary insulating varnish or insulating plates. Preferably, the cross-section of the magnetic portions of the armature 301 is such that when said armature is entirely located within the air-gaps 311a (or 311b), which is the position of minimum reluctance of the magnetic circuit, the armature 301 is saturated while the corresponding fixed magnetic circuit core 312a or 312b remains unsaturated. Iron losses are thus kept to a minimum. It will also be noted that the coils 315a, 315b surround the magnetic cores 314a and 314b, respectively. This makes it possible to produce a magnetic field within the air-gap with a minimum number of ampere-turns.

The coils 315a and 315b are connected in parallel to an alternating-current source 316 (for example, single-phase 50 cycles) through rectifiers 317a and 317b which are mounted in opposition. The rectifiers 317a and 317b can be of any suitable type, such as metallic rectifiers, diodes, thyratrons and so forth, depending on the power requirements.

The connection between the current source 316 and the windings 315a, 315b is preferably through a transformer 320, the adjustable tap of which is designated 330 and serves to regulate the supply voltage from a substantially zero value to maximum value. As described below, this makes it possible to adjust the stroke of the armature 301 and consequently the travel of the moving parts of the machine.

The electro-compressor (or electro-pump) machine of FIGS. 22 to 24 further comprises a cylinder 321 of non-magnetic material which is fastened by fasteners 322 to the outer face of the circuit 312a. The cylinder 321 is provided with an inlet system 323 and output or exhaust system 324 and contains the compressor piston 303. In the embodiment considered, the mass M of the moving parts (armature 301, rod 302, piston 303) is sufficiently small to ensure that its natural oscillation frequency under the effect of all the forces applied (said frequency being proportional to $M^{-\frac{1}{2}}$) is less than the frequency of the current source 316 at all loads other than nominal and close to the frequency of that source at nominal load. This aspect of the machines of the invention has been discussed previously. This condition should also be satisfied at all delivery pressures and at all flow rates.

In order to increase the natural frequency of the moving parts (parts 301, 302 and 303), provision is made for the addition thereto of a spring force, such as that provided by a "spring cushion" 325 which is formed by a residual fluid volume between the bottom 326 of the cylinder 321 and the piston 303 when the piston is located at the end of its travel. The function of the spring cushion is to develop a resilient force which tends to resist the displacement of the piston 303.

The operation of the machine at FIGS. 22 to 24 is as follows: the source 316 supplies through the rectifiers 317a and 317b a current pulse to the coils 315a and 315b alternately, the energization of one coil commencing as soon as the other coil is de-energized. Because of the structure and relative positions of the magnetic circuits 312a and 312b, the flux fields of each circuit are limited essentially to the corresponding air-gaps 311a or 311b and decrease very rapidly outside of each air-gap. When, for example, the flux increases within the coil 315a and the armature 301 is in the position shown in FIG. 22, said armature tends to move into the position of minimum reluctance, thereby displacing the piston 303 in the direction represented by the arrow G. The induction decreases very rapidly outside of the air-gap 311a, with the result that, taking into account the spacing of the circuits 312a and 312b, steps can be taken to ensure that the armature 301 can still be partially engaged within the air-gap 311b when it has reached the end of travel in the direction G, namely in the position of minimum reluctance in the case of circuit 312a.

At the next current alternation, the flux decreases within the circuit 312a and increases within the circuit 312b, thereby displacing the armature 301 in the direction G'. At the end of travel in the direction G', the air in the spring cushion 325 is compressed and accordingly assists in returning the piston in the direction G with a force which is proportional to the pressure within the cushion 325. This return force can be regulated by causing a predetermined quantity of fluid at a predetermined pressure to be introduced from a suitable source (not shown) into the spring cushion 325 either initially or at any time during the stroke. The same result can, alternatively, be obtained by increasing or decreasing the dimensions of the dead space constituting the spring cushion 325 when the piston 323 is at the end of its travel.

By reason of the action of the spring cushion 325 or simply by virture of the magnetic field outside of the air-gap, it is unnecessary to make provision for ensuring that the armature 301 will remain partially within the air-gap 311a when the armature has reached the minimum reluctance position within the air-gap 311b.

The fact that the natural frequency of the moving parts is close to that of the current pulses supplied from the source 316 makes the system self-stabilizing, under all operating conditions. The form of mechanical and electromagnetic elements of the machine also makes possible a particularly high specific mass output as a result of the small size of the moving parts and a high efficiency resulting especially from limiting eddy-current losses.

The motor can be started-up simply by connecting it to the electric current source at full operating voltage by progressively increasing the voltage or by any known means for initiating the displacement of the armature 301 in back-and-forth motion, in particular by means of an injection of compressed-air into the spring cushion 325. An increase in the output of the compressor (or pump) or an increase in motor power are obtained simply by increasing the power supply current, such as by changing the adjustable tap 330 of the transformer 320.

Figure 25:
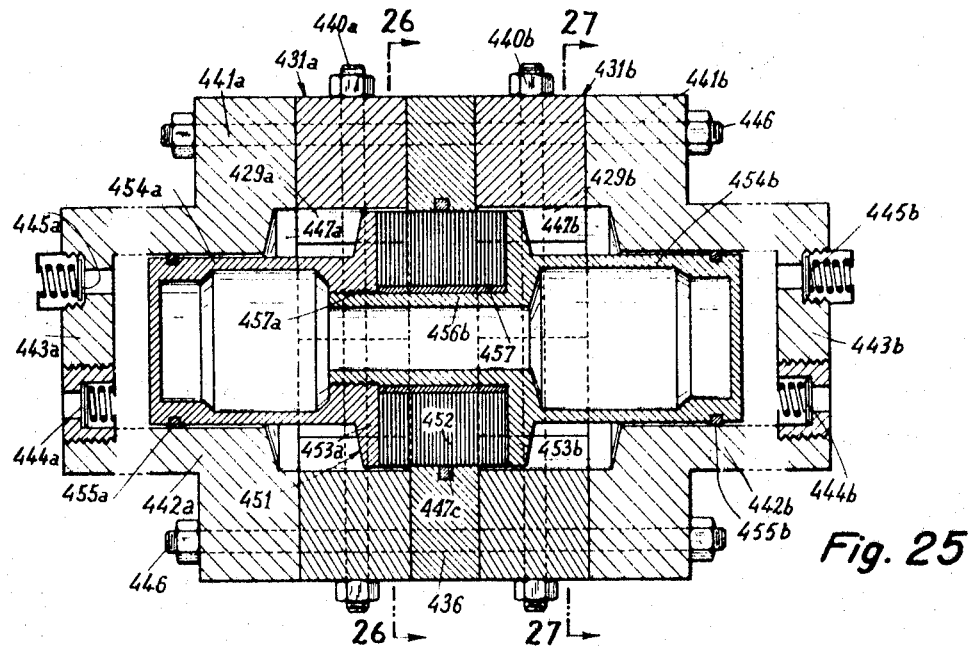
FIG. 25 shows a sixth embodiment in longitudinal cross-section, as taken along lines 25—25 of FIG. 26.
Figure 26:
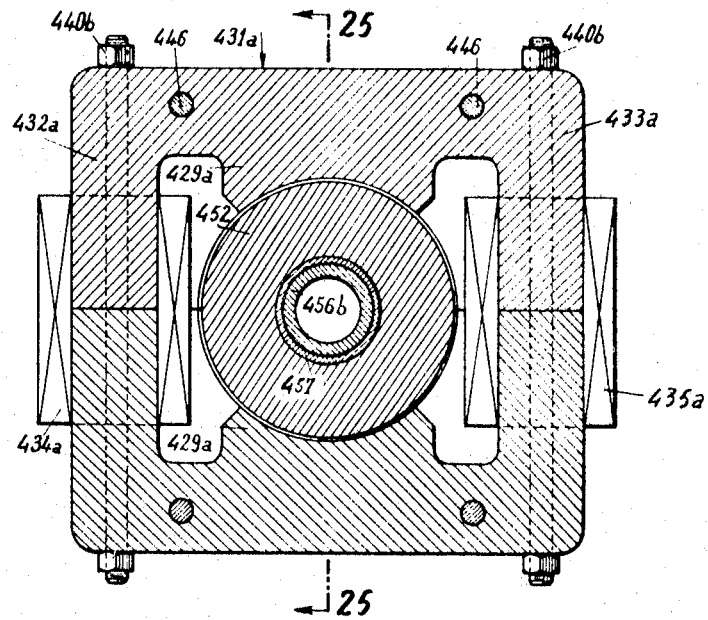

The embodiment of FIGS. 25 to 27 is a double-acting electro-pump or electro-compressor in which two stationary magnetic circuits 431a and 431b, each composed of two parts 432a, 433a and 432b, 433b, respectively, are mounted in parallel relation and provide oppositely-facing pairs of pole-pieces 429a and 429b. Each circuit is preferably laminated, each lamination being an E-shaped plate. The two blocks of laminations are clamped together by means of tie-bolts 440a and 440b. The pole-pieces 429a, 429b have cylindrical faces, matching the cylindrical-shaped armature part (described below).

Electromagnetic induction coils are wound around the circuit cores 432a and 433a, an identical arrangement being adopted in the case of the circuit core 431b. The windings 434a and 435a of the circuit 431a are supplied in phase with each other with pulsed current in alternation with current pulses supplied to the windings of the other circuit 431b, just as in the embodiment of FIGS. 22 to 24.

The magnetic circuits 431a and 431b are separated by a non-magnetic spacer 436 and are abutted on the sides opposite from the spacer by the flanges 441a and 441b of two cylinders 442a and 442b which are made of a non-magnetic material. The head 443a, 443b of each cylinder is provided with an inlet or intake system 444a, 444b and an exhaust system 445a, 445b. The assembly of cylinders, fixed circuit parts and the spacer is clamped together by means of longitudinal tie-bolts 46 of non-magnetic material.

The machine of FIGS. 25 to 27 further includes a central cylindrical bore which receives the sliding armature part 451 while at the same time forms two oppositely-acting spring cushions 447a and 447b at opposite ends of the central bore. The armature part 451 is cylindrical and comprises a magnetic armature portion made up of a stack of annular laminations 452 which are suitably insulated and clamped between two annular flanges 453a, 453b of two hollow pistons 454a, 454b. The annular piston flanges 453a, 453b also serve as pistons for the spring cushions 447a, 447b. A packing-ring 447c separates the two ends of the machine. The pistons 454a, 454b slide within the cylinders 442a, 442b and are sealed to the cylinder walls by rings 455a, 455b.

The apparatus is capable of running without external lubrication, provided that materials having self-lubricating or low-friction properties, such as polytetrafluoroethylene ("Teflon") are employed for the rings or other co-engaging surfaces.

The piston 454b is provided with a hollow sleeve 456b which serves to center and mount the laminations 452. A threaded end of the sleeve is screwed into a tapped hole 457a in the piston 454a. This threaded connection serves the dual function of coupling the two pistons 454a, 454b and clamping the armature laminations 452 together. The flanges 453a and 453b engage the ends of a tubular spacer member 457 and make it possible to adjust the overall length of the block of laminations 552 and consequently to regulate the compression which is exerted on them. It will be apparent that other clamping means can be provided, such as, for example, a stud passed through from one piston to the other.

The moving system might well be a one-piece aluminum casting, the armature laminations being in such a case formed by circular half-rings which are compressed together to a dimension which is determined by the flanges 453a and 453b, or alternatively compressed by means of the insertion of two half-rings which perform the function of packing-pieces. Tension can be applied to the armature prior to insertion of the laminations to permit this installation, the release of the tension providing the clamping force.

Taking into account the presence of the two spring cushions 447a, 447b or of the magnetic field which prevails outside of the air-gap, the design should ensure that the laminations 452 do not engage the air-gap of circuit 431b when the armature 451 is in the position of minimum reluctance with respect to the circuit 431a and, conversely, the armature should not engage the air gap of circuit 431a when the armature is in the position of minimum reluctance with respect to circuit 431b. The travel of the armature 451 is thus perfectly symmetrical with respect to the stationary magnetic circuits 431a and 431b.

Preferably, the centering tolerances of the moving parts are fixed so as to limit the eccentric displacement of the sliding armature relatively to the axis of the machine to a value which is sufficiently small to ensure that the effort exerted on the armature at right angles to the axis is negligible.

The electromagnetic control system is arranged and operates as in the case of the embodiments previously described. The presence of the spring cushions 447a, 447b plays a significant part in endowing the armature 451 with a natural frequency which is less than that of the alternating-current supply, at part load as discussed previously.

The reciprocating motion of the armature 451 in synchronism with the pulsating magnetic field of the circuits 431a, 431b initiates the operation of the valves 444a, 445a; 444b, 445b in a manner which is known per se.

The machine can be started up as in the previous embodiments such as, for example, by means of an injection of compressed air into one of the spring cushions 429a, 429b.

It will be observed that the machine is of very simple, compact and symmetrical structural design and is also made up of only a small number of parts.

Figure 29:
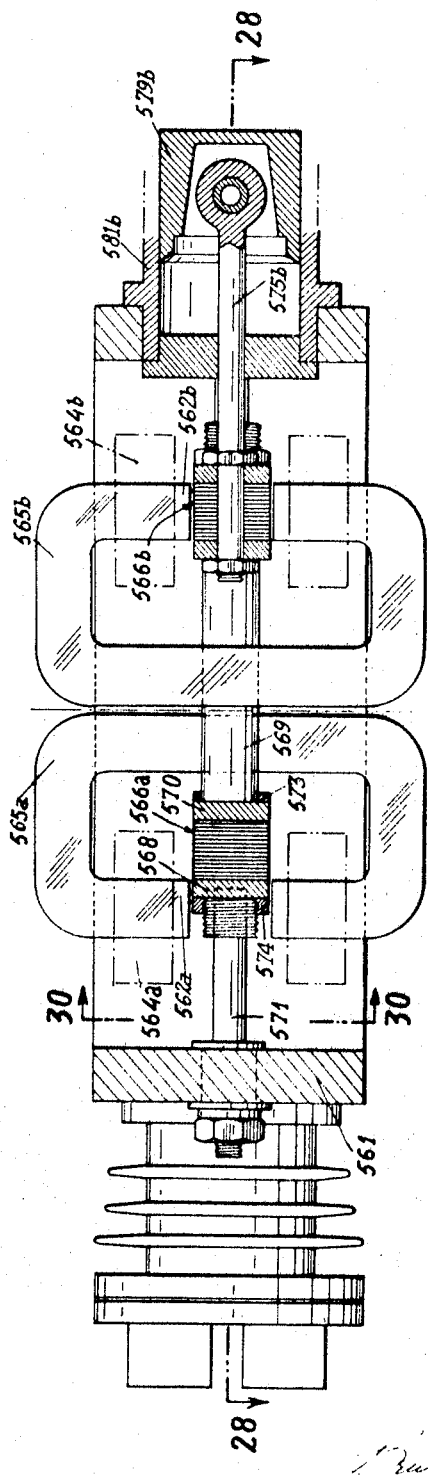
FIG. 29 is a longitudinal sectional view taken along the line 29—29 of FIG. 28.
Figure 30:
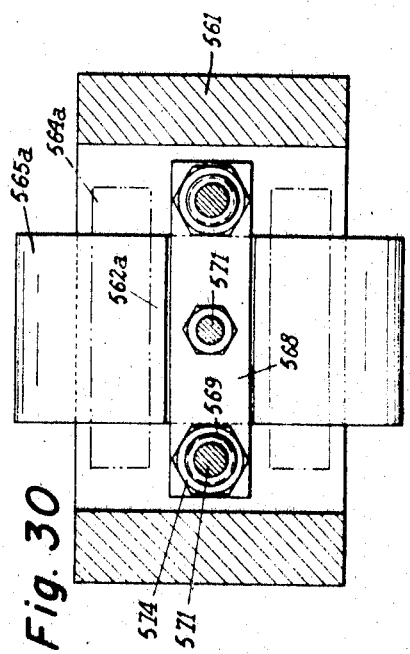
FIG. 30 is a cross-sectional view taken along the lines 30—30 of FIG. 28.

The version of FIGS. 28 to 30 is also a double-acting electro-compressor or electro-pump. In this machine, the magnetic circuits 565a and 565b are C-shaped and are placed back to back. They are provided with magnetic windings 564a and 564b and are formed of laminations of steel sheet secured to a hollowed-out, parallelepipedal-shaped casing 561 by means of support braces (not shown). The windings 564a are supplied with current pulses through rectifiers (not shown) and are connected to act in opposition to the windings 564a, the power supply being the same as that of the embodiment of FIGS. 22 to 24. The pole-pieces 562a and 562b have flat pole faces owing to the parallelepipedal configuration of the armature.

The moving parts of the electro-compressor include two circuit armatures 566a and 566b of identical construction. Each armature consists of a parallelepipedal stack of laminations 567 of magnetic metal which are separated by insulation and are clamped between two nonmagnetic end plates 568 and 570 fitted over parallel tubes 569. The tubes 569 constitute spacer members and also serve as guides which permit the moving parts to slide over parallel supporting rods 571 which are carried by the casing 561 and secured in position by means of nuts 572. The end plates 568 bear against annular shoulders 573 on the tubes 569 and are fastened by nuts 574.

The armatures 566a and 566b are coupled to pistons 579a and 579b by axial tie-rods 575a and 575b, the tie rods being secured by nuts 576a and 576b to pins 578a and 578b extending diametrically of the cylindrical wall portions 577a and 577b of the pistons. The pistons 579a and 579b are slidably received within cylinders 581a and 581b of the compressor (or pump). The cylinder heads 582a and 582b are equipped with intake and discharge valves which are designated by the reference numerals 583a and 584a. The cylinders 581a and 581b are closed at their inner ends by walls 590a and 590b, the tie-rods 575a, 575b passing through O-ring seals 585a and 585b which seal the cylinders.

The portions 586a and 586b of the cylinders between the pistons 579a and 579b and the walls 590a and 590b, respectively, constitute spring cushions. Passages or slots in the cylinder walls (not shown in the drawings) limit the build-up of pressure in the spring cushion to only the latter portion of the return travel of the piston by permitting air to escape during the initial portion of travel.

As in the other embodiments, in which there are two magnetic circuits, the windings 564a and 564b are energized in such a manner that the magnetic fields are produced in alternate sequence. Thus, upon a current pulse, the armature 566a is attracted into the air-gap between the poles 562a while the armature 566b is pulled out of the air gap between the poles 562b. The tie-rods 575a and 575b correspondingly displace the pistons 579a and 579b which, respectively, force the fluid in the cylinder 581a out of the cylinder into the pump or compressor circuit and draw fluid into the cylinder 581b. At the same time, the piston 579b compresses the air in the spring cushion 586b to create a restoring force.

In the above embodiments, it should be mentioned that the armatures may be locks of magnetic metal instead of stacks of laminations without departing from the scope of the invention.

In the last two versions (FIGS. 25 to 30) of the invention, it will be noted that the electric and pneumatic forces are substantially symmetrical during the forward travel and return travel of the moving parts, this is a condition very favorable to the stability of operation of the machine.

It will be apparent to those skilled in the art that numerous variations and modifications of the embodiments hereinabove described can be made. For example, the spring cushions can be replaced by dead spaces at the ends of travel of the compressor pistons, or provision can also be made for a dead range of travel prior to the commencement of the compression, the effect of these two expedients being to increase the natural frequency of the moving parts. Depending on requirements, the power supply for the machines may include a frequency multiplier, a frequency divider or other form of frequency changer between the alternating-current source and the electromagnetic windings.

Provision may be made for a moving system comprising either a single armature per magnetic circuit or a number N of armatures in alignment so as to form a single moving system which pases through N or 2N airgaps in sequence. Provision can also be made for magnetic circuits which permit of a common return branch.

Variations in the compressor (or pump) portion of the machines can be made. Thus, in the embodiment of FIGS. 22 to 24, the piston may be made operative to provide delivery in both directions of travel by providing the cylinder with two pairs of valves or the like which are located on each side of the piston, each pair being similar to the valves 323 and 324 (FIG. 22). This arrangement makes it possible to obtain a double-acting machine in which only a single piston is employed and in which the mechanical and electrical forces acting on the moving parts in both directions of travel are symmetrical.

Thus, the above-described embodiments of the invention are to be considered as merely exemplary, and the scope of the invention is not to be limited except in such manner as defined in the appended claims.

I claim:

1. A reciprocating machine comprising a device having a reciprocating element adapted to be driven; an electric motor for driving the element and having at least one fixed electromagnetic circuit having a pair of spaced-apart poles defining an air gap and at least one field coil adapted to generate a magnetic field across the air gap, a magnetic armature mounted for reciprocating movement along an axis disposed transversely to the magnetic field across the air gap and coupled to the reciprocating element to drive it, and means for supplying a succession of unidirectional electric current pulses to the field generating coil each of which generates a magnetic field to drive the armature in one direction into the air gap, the current supply including means for initiating each current pulse when a voltage of given polarity is impressed across the field coil, said means for preventing the current from reversing direction in the field coil, and said means for controlling the interruption of each pulse when the current in the coil becomes substantially zero and for maintaining the interruption until the supply voltage is of the said given polarity; and means for matching the motor to the driven device including return means distinct from the electromagnetic circuit for driving the armature in the other direction to an extent locating the major portion thereof outside of the air gap.

2. A machine according to claim 1, including elastic means for driving the armature in the said one and/or in the other direction, wherein the mean value of the forces produced on the armature by the magnetic field is greater than the mean value of the net resulting force produce on said armature in the said one direction by said elastic means.

3. A machine according to claim 1, including elastic means for driving the armature in the said one and/or in the other direction, wherein the mean value of the forces produced on the armature by the magnetic field is at least five times greater than the mean value of the net resulting force produced on said armature in the said one direction by said elastic means.

4. A machine according to claim 1 wherein the natural vibration frequency of the armature including the effect of all elastic forces acting on it is close to the frequency of the current impulses.

5. A machine according to claim 1 wherein the natural vibration frequency of the armature including the effect of the forces applied is less than the frequency of the current impulses for loads below nominal load.

6. A machine according to claim 1 wherein the magnetic properties of the electromagnetic circuit and the armature are such that the increase of flux across the air gap, as a function of the rate of entry of the armature into the air gap with the current maintained constant, is approximately linear under static conditions.

7. A machine according to claim 1 wherein the poles of the electromagnetic circuit are laminated in a direction transverse to the axis of reciprocation of the armature.

8. A machine according to claim 1 wherein the magnetic properties of the armature and electromagnetic circuit are such that the armature is saturated at a flux density which is less than the flux density at which the electromagnetic circuit is saturated.

9. A machine according to claim 1 wherein the poles are cylindrical and the armature is a cylindrical body.

10. A machine according to claim 9 wherein means are provided to allow free rotation of the moving part around its axis.

11. A machine according to claim 1 wherein the total residual clearance between the poles and the armature when the armature is in position between the poles is less than about one-fifth the distance separating the poles, and wherein the said clearance is substantially independent of the stroke of the armature.

12. A machine according to claim 1 wherein the armature includes laminated plates located in planes parallel to the flux and to the axis of reciprocation of the armature.

13. A machine according to claim 1 wherein the armature includes laminated plates located in planes perpendicular to the axis of reciprocation of the armature.

14. A machine according to claim 13 wherein the armature lamination plates are tapered with increasing thickness in the said other direction.

15. A machine according to claim 2 wherein the elastic means is a mechanical energy accumulator.

16. A machine according to claim 2 wherein the elastic means includes means defining a chamber containing an elastic fluid providing a cushion of such fluid, the chamber means including a movable wall coupled to and movable with the armature.

17. A machine according to claim 16 wherein the elastic means includes means for controlling fluid cushion force.

18. A machine according to claim 17 wherein means for controlling the fluid cushion force includes a one-way outlet valve thereby to establish in the chamber a pressure below the atmospheric pressure.

19. A machine according to claim 1 comprising mechanical means acting on the moving part to locate the major portion of the armature outside the air gap in its rest position.

20. A machine according to claim 1 wherein the return means provides a maximum force on the armature at substantially the end of travel of the armature at the end of the electromagnetic phase of each operating cycle.

21. A machine according to claim 1 wherein the current pulse supplying means includes means for controlling the duration of the electric impulses supplied to the electromagnetic circuit.

22. A machine according to claim 1 wherein the current pulse supplying means includes means for controlling the amplitude of the electric impulses supplied to the electromagnetic circuit.

23. A machine according to claim 1 wherein the current pulse supplying means includes means for controlling the frequency of the electrical impulses supplied to the electromagnetic circuit.

24. A machine according to claim 1 wherein the current pulse supplying means includes means for controlling the voltage of the electrical pulses supplied to the electromagnetic circuit.

25. A machine according to claim 1 wherein the residual clearance between the armature and each pole is equal to at least twice the maximum possible lateral displacement of the armature from its axial position.

26. A machine according to claim 1 wherein the driven element is so arranged to provide delivery upon each electric pulse and consequent armature movement in the said one direction.

27. A machine according to claim 1 wherein the driven element is so arranged to provide delivery upon action of the return means and consequent armature movement in the said other direction.

28. A machine according to claim 1 further comprising a fluid pump having a chamber and a member movable within the chamber, the magnetic armature being coupled to and supported and guided by the said movable member.

29. A machine according to claim 28 wherein the magnetic armature is supported and guided by the said movable member.

30. A machine according to claim 28 further comprising means communicating the fluid pump to the electromagnetic circuit to provide delivery of a cooling and/or lubricating fluid to the circuit.

31. A machine according to claim 1 further comprising rigid spacer means coupled to the electromagnetic circuit for maintaining a predetermined separation between the poles.

32. A machine according to claim 31 wherein the spacer means includes means mounting and guiding the armature.

33. A machine according to claim 1 wherein the minimum dimension of the armature in a direction transverse to the magnetic flux is at least twice the width of the air gap.

34. A machine according to claim 1 wherein there are only one electromagnetic circuit and only one armature associated with the circuit.

35. A machine according to claim 1 wherein there are two electromagnetic circuits.

36. A machine according to claim 35 wherein there is only one armature, the circuits are spaced from each other and disposed to locate their air gaps along the axis of movement of the armature, and the current pulse supplying means supplies alternate pulses to the respective circuits thereby to draw the armature alternately into the air gaps thereof.

37. A machine according to claim 35 wherein there is one armature for each of the two circuits, the two armatures being coupled for conjoint movement, a non-magnetic separator being positioned between the armatures and the armatures being mounted on a moving part such that at a given position of the moving part, the reluctance of one circuit is at a maximum value while the reluctance of the other circuit is at a minimum value, wherein the circuits are disposed to locate their air gaps along the paths of movement of the respective armatures, and wherein the current pulse supplying means supplies alternate pulses to the respective circuits thereby to draw the respective armatures alternately into the air gaps thereof.

38. A machine according to claim 1 further comprising means providing a force in the said one direction limiting the movement of the armature out of the air gap to a predetermined extent.

39. A machine according to claim 38 wherein the limiting means provides an elastic force, the mean value of the elastic force being substantially less than the mean value of the electromagnetic forces on the armature.

40. A machine according to claim 39 wherein the limiting means is a spring coupled to the armature.

41. A machine according to claim 39 wherein the elastic means includes means defining a chamber constituting an elastic gas cushion and an element coupled to the armature and movable in the chamber.

42. A machine according to claim 41 further comprising valve means for controlling the gas cushion force.

43. A reciprocating machine comprising a device having a reciprocating element adapted to be driven; an electric motor for driving the element and having at least one fixed electromagnetic circuit having a pair of spaced-apart poles defining an air gap and at least one field coil adapted to generate a magnetic field across the air gap, a magnetic armature of high magnetic permeability and presenting a low electrical conductivity along closed loops limiting an area which is traversed by a finite magnetic flux generated by said field coil, mounted for reciprocating movement along an axis transecting and disposed transversely to the magnetic field across the air gap and coupled to the reciprocating element to drive it, means for supplying a succession of unidirectional electric current pulses to the field generating coil to drive the armature in one direction into the air gap, the current supply including means for initiating each current pulse when a voltage of given polarity is impressed across the field coil, said means for preventing the current from reversing in the coil at the end of each pulse, and said means for controlling the interruption of each pulse when the current in the coil becomes substantially zero and for maintaining the interruption until the supply voltage is of the said given polarity; and means for matching the motor to the driven device including return means distinct from the electromagnetic circuit for driving the armature in the other direction to an extent locating the major portion of the armature outside of the air gap at the end of a stroke, and elastic means for driving the armature in the said other or in the one direction, the mean value of the forces on the armature produced by the elastic means being not in excess of the forces on the armature produced by the magnetic field.

44. A machine according to claim 43 wherein the elastic means is a mechanical energy accumulator operating to receive and store energy as the armature is moved in the said other direction and to stop the armature and initiate its movement in the said one direction.

45. A machine according to claim 43 wherein the elastic means includes means defining a chamber containing an elastic fluid providing a cushion of such fluid, the chamber means including a movable wall coupled to and movable with the armature.

46. An electromagnetically driven fluid pump comprising means defining a fluid chamber having a head portion and a base portion, a movable compression member mounted for sliding reciprocating movement in the chamber, intake and exhaust means for admitting and delivering fluid to and from the chamber, at least one electromagnetic circuit affixed to the chamber-defining means and having a pair of spaced-apart poles defining an air gap and at least one field generating coil adapted to generate a magnetic field across the air gap, a magnetic armature coupled to the compression member for reciprocating movement therewith and positioned to move through the air gap along an axis substantially perpendicular to the magnetic field, means for supplying a succession of unidirectional electric current pulses to the field generating coil to drive the armature in one direction, the current supply including means for initiating each current pulse when a voltage of given polarity is impressed across the field coil, said means for preventing the current from reversing direction in the field coil, and said means for controlling the interruption of each pulse when the current in the coil becomes substantially zero and for maintaining the interruption until the supply voltage is of the said given polarity, and return means distinct from the electromagnetic circuit for driving the armature in the other direction to an extent locating the major portion thereof outside of the air gap at the end of a stroke.

47. A fluid pump according to claim 46 wherein a part of the chamber on one side of the compression member constitutes an elastic cushion limiting movement of the armature out of the air gap to a predetermined extent.

48. A fluid pump according to claim 46 wherein the return means includes a spring coupled to the armature.

49. A fluid pump according to claim 48 wherein the spring is in the chamber and engages the compression member.

50. A fluid pump according to claim 46 wherein the return means drives the compression member on the compression stroke of the pump and the electromagnetic circuit drives the compression member on the return stroke.

51. A fluid pump according to claim 46 wherein the electromagnetic circuit drives the compression member on the compression stroke and the return means drives the compression member on the return stroke.

52. A fluid pump according to claim 46 wherein there are two electromagnetic circuits spaced from each other for coaction with a single magnetic armature, and wherein the means providing current pulses includes means for providing to each circuit pulses in alternation with the other, thereby electromagnetically to drive the armature in both directions.

53. A fluid pump according to claim 46 wherein there are two electromagnetic circuits spaced apart for coaction with two conjointly movable magnetic armatures separated from each other by a non-magnetic spacer, and wherein the means providing current pulses includes means for providing to each circuit pulses in alternation with the other, thereby electromagnetically to drive the armatures in both directions.

54. A fluid pump according to claim 52 wherein there are two fluid chambers, each having a compression member and intake and exhaust means, and wherein the compression members are so coupled to the armature and the inlet and exhaust means are so arranged to provide delivery upon each electric pulse and consequent armature movement.

55. A fluid pump according to claim 53 wherein there are two fluid chambers, each having a compression member and intake and exhaust means, and wherein the compression members are so coupled to the armatures and the inlet and exhaust means are so arranged to provide delivery upon each electric pulse and consequent armature movement.

56. A fluid pump according to claim 46 wherein the intake and exhaust means are in the head portion of the chamber, the means for driving the armature in the said other direction includes a return spring operatively coupled to the armature, and wherein a part of the base portion of the chamber is closed and constitutes a gas cushion in which a gas is compressed to establish an elastic force acting in the said one direction on the compression member.

57. A fluid pump according to claim 56 wherein the base portion of the chamber includes a one-way outlet valve thereby to establish a reduced pressure in the base portion as the compression member moves in the said one direction.

58. A fluid pump according to claim 57 wherein the outlet valve is spaced from the extreme base end of the chamber such that the part of the base portion is closed for a predetermined part of the movement of the compression member thereby to develop the said elastic force.

59. A fluid pump according to claim 46 wherein the intake and exhaust means are in the base portion of the chamber and the means for driving the armature in the other direction includes a spring engaged between the head end of the compression member and the chamber head, whereby the pump provides delivery upon movement of the compression member in the said other direction.

60. A fluid pump according to claim 46 wherein the moving part includes a recess to afford communication between cooling passages formed in the magnetic circuit and/or the driven machine, whereby cooling fluid is conducted between the circuit and the base portion of the chamber during predetermined portions of the operating stroke.

61. A fluid pump according to claim 46 wherein the poles are cylindrical, the chamber is defined by an elongated cylindrical surface, the armature and compression member are substantially contiguous cylindrical bodies, and the intake and exhaust means are in the head portion of the chamber.

62. A fluid pump according to claim 61 wherein the return means includes a spring engaged between the armature and a housing member disposed generally opposite the chamber.

63. A fluid pump according to claim 61 wherein the magnetic circuit has a core of generally rectilinear configuration in plan and formed with inwardly extending leg portions each carrying a field generating coil, the inwardly facing portions of the legs being arcuate to match the cylindrical shape of the armature.

64. A fluid pump according to claim 61 further comprising a housing carrying the magnetic circuit and having an internal space receiving a lubricating and cooling liquid, and wherein the armature and compression member include passage means for conducting the cooling and lubricating fluid to the wall of the fluid chamber.

65. A fluid pump according to claim 46 further comprising means porviding a force in the said one direction limiting the movement of the armature out of the air gap to a predetermined extent.

66. A fluid pump according to claim 65 wherein the limiting means provides an elastic force, the mean value of the elastic force being substantially less than the mean value of the electromagnetic forces on the armature.

67. A fluid pump according to claim 66 wherein the limiting means is a spring coupled to the armature.

68. A fluid pump according to claim 66 wherein the elastic means includes means defining a chamber constituting an elastic gas cushion and an element coupled to the armature and movable in the chamber.

69. An electromagnetically driven fluid pump comprising means defining a fluid chamber having a head portion and a base portion, a compression member mounted for reciprocating movement in the chamber, intake and exhaust means in the head portion for admitting and delivering fluid to and from the head portion, first and second electromagnetic circuits affixed adjacent the base portion of the chamber, each circuit having a pair of spaced-apart poles defining an air gap and at least one field generating coil adapted to generate a magnetic field across the air gap, the circuits being disposed to center the air gaps on the axis of movement of the compression member and being spaced from each other along the said axis, a magnetic armature coupled to the compression member for reciprocating movement therewith and positioned to move through the air gaps, means for supplying to the field generating coil of each circuit in alternation with the other circuit a succession of unidirectional electric current pulses thereby to drive the armature in reciprocating movement, the current supply including means for initiating each current pulse when a voltage of given polarity is impressed across the field coil said, means for preventing the current from reversing direction in the field coil, and said means for controlling the interruption of each pulse when the current in the coil becomes substantially zero and for maintaining the interruption until the supply voltage is of the said given polarity, and elastic means including a gas cushion in the base portion of the fluid chamber for providing an elastic force on the armature and compression member acting in a direction toward the head portion of the chamber, the mean value of the gas cushion forces being substantially less than the forces generated by the magnetic field driving the armature and compression member toward the head portion.

70. An electromagnetically driven fluid pump comprising first and second fluid chambers each having a head portion and a base portion and carrying a compression member mounted for reciprocating movement in the chamber, the fluid chambers being spaced and being mounted in facing relation with their head portions remote from each other and their axes in alignment on a common axis of movement of the compression members, intake and exhaust means for admitting and delivering fluid to and from each chamber, first and second electromagnetic circuits mounted between the chambers, each circuit having a pair of spaced-apart poles defining an air gap and at least one field generating coil adapted to generate a magnetic field across the air gap, the circuits being disposed to center the air gaps on the axis of movement of the compression members in the chambers and being spaced from each other along the said axis, at least one magnetic armature mounted between the compression members for reciprocating movement therewith and positioned to move through the air gaps, means for supplying to the field generating coil of each circuit in alternation with the other circuit a succession of unidirectional electric current pulses thereby to drive the armature and compression members in reciprocating movement, the current supply including means for initiating each current pulse when a voltage of given polarity is impressed across the field coil, said means for preventing the current from reversing direction in the field coil, and said means for controlling the interruption of each pulse when the current in the coil becomes substantially zero and for maintaining the interruption until the supply voltage is of the said given polarity, and elastic means providing forces on the armature and compression members in the direction of each chamber to supplement the electromagnetic forces, the mean value of the elastic forces being substantially less than the forces generated by the magnetic fields.

71. A fluid pump according to claim 70 wherein the armature and circuit poles are matching cylinders of larger cross-section than the compression members, the chambers including enlarged portions in the base coacting with the armature to define gas cushions providing the said elastic forces.

72. A fluid pump according to claim 70 wherein there are two armatures spaced from each other with a nonmagnetic spacer interposed between them.

73. A fluid pump according to claim 70 further comprising a housing carrying the chambers, at least two slide bars on the housing and extending parallel to the axis of the chambers, the armature being slidably mounted on the slide bars thereby to restrict deflection thereof from the axis.

References Cited

UNITED STATES PATENTS

| | | | |
|---|---|---|---|
| 1,934,994 | 11/1933 | Nahman et al. | 103—53 XR |
| 2,430,758 | 11/1947 | Crise | 103—53 XR |
| 2,721,024 | 10/1955 | Zeh | 230—55 |
| 2,721,453 | 10/1955 | Retter | 230—55 XR |
| 2,833,220 | 5/1958 | Robinson et al. | 310—24 XR |
| 2,839,237 | 6/1958 | Dolz | 230—55 |
| 2,954,917 | 10/1960 | Bayer | 230—55 |
| 3,119,940 | 1/1964 | Pettitet et al. | 310—24 |
| 3,134,938 | 5/1964 | Morgan | 310—30 XR |
| 3,196,797 | 7/1965 | Marini | 310—18 XR |
| 3,221,798 | 12/1965 | Kofink | 103—53 |

ROBERT M. WALKER, Primary Examiner

U.S. Cl. X.R.

310—18; 318—119

PO-1050
(5/69)

UNITED STATES PATENT OFFICE
CERTIFICATE OF CORRECTION

Patent No. 3,461,806      Dated Aug. 19, 1969

Inventor(s) Maurice Barthalon

It is certified that error appears in the above-identified patent and that said Letters Patent are hereby corrected as shown below:

Col. 1, line 36, "alternatively" should read --alternately--; line 56, after "type" insert --with--. Col. 5, line 29, "those" should read --these--. Col. 8, line 43, "itno" should read --into--; line 54, "motion" should read --motive--. Col. 9, line 33, "al" should read -- all--. Col. 11, line 25, "in" should read --an--; line 28, after "as" insert --an--. Col. 12, line 28, after "and" insert --a--. Col. 15, line 5, "123" should be --213--. Col. 17, line 6, "virture" should read --virtue--. Col. 19, line 49, "locks" should read --blocks--. Col. 20, line 49, "produce" should read --produced--. Col. 25, line 49, the comma after "said" should be before "said".

SIGNED AND
SEALED
MAY 5 1970

(SEAL)
Attest:

Edward M. Fletcher, Jr.
Attesting Officer

WILLIAM E. SCHUYLER, JR.
Commissioner of Patents